United States Patent
Sakawaki et al.

(10) Patent No.: US 9,689,398 B2
(45) Date of Patent: Jun. 27, 2017

(54) MAGNETIC BEARING DEVICE AND COMPRESSOR

(71) Applicant: DAIKIN INDUSTRIES, LTD., Osaka-shi, Osaka (JP)

(72) Inventors: Atsushi Sakawaki, Shiga (JP); Yuji Nakazawa, Shiga (JP); Yusuke Irino, Shiga (JP); Naoya Yamashita, Shiga (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 399 days.

(21) Appl. No.: 14/369,412

(22) PCT Filed: Dec. 19, 2012

(86) PCT No.: PCT/JP2012/008116
§ 371 (c)(1),
(2) Date: Jun. 27, 2014

(87) PCT Pub. No.: WO2013/099158
PCT Pub. Date: Jul. 4, 2013

(65) Prior Publication Data
US 2014/0363321 A1    Dec. 11, 2014

(30) Foreign Application Priority Data
Dec. 28, 2011    (JP) ................. 2011-289853

(51) Int. Cl.
*F04D 29/058*    (2006.01)
*F16C 32/04*    (2006.01)
(Continued)

(52) U.S. Cl.
CPC ........... *F04D 29/058* (2013.01); *F04D 25/06* (2013.01); *F16C 32/0451* (2013.01); *H02K 7/09* (2013.01)

(58) Field of Classification Search
CPC ............................. F04D 29/058; H02K 7/09
(Continued)

(56) References Cited

U.S. PATENT DOCUMENTS 8,891,064 B2 * 11/2014 Shibazaki ........... G03F 7/70766
310/12.05

FOREIGN PATENT DOCUMENTS

JP    5-141423 A    6/1993
JP    5-312214 A    11/1993
(Continued)

OTHER PUBLICATIONS

International Search Report issued in PCT/JP2012/008116, mailed on Feb. 19, 2013.

*Primary Examiner* — David S Luo
(74) *Attorney, Agent, or Firm* — Birch, Stewart, Kolasch & Birch, LLP

(57) ABSTRACT

A magnetic bearing body supports a rotating shaft using a combined electromagnetic force of a pair of control electromagnets without contact. A controller detects a control index value based on a first coil current passed through a coil of a first control electromagnet of the pair of control electromagnets which generates an electromagnetic force in the same direction as that of a load exerted on the rotating shaft, the control index value being an index of the degree of margin for error in control depending on a value of the first coil current. And the controller controls a middle value of a pair of coil currents passed through the respective corresponding coils of the pair of control electromagnets so that the control index value approaches a predetermined target index value.

15 Claims, 23 Drawing Sheets

(51) Int. Cl.
*F04D 25/06* (2006.01)
*H02K 7/09* (2006.01)

(58) Field of Classification Search
USPC .................................................. 318/519, 494
See application file for complete search history.

(56) References Cited

FOREIGN PATENT DOCUMENTS

| | | |
|---|---|---|
| JP | 10-141373 A | 5/1998 |
| JP | 2002-333019 A | 11/2002 |
| JP | 2008-196442 A | 8/2008 |

\* cited by examiner

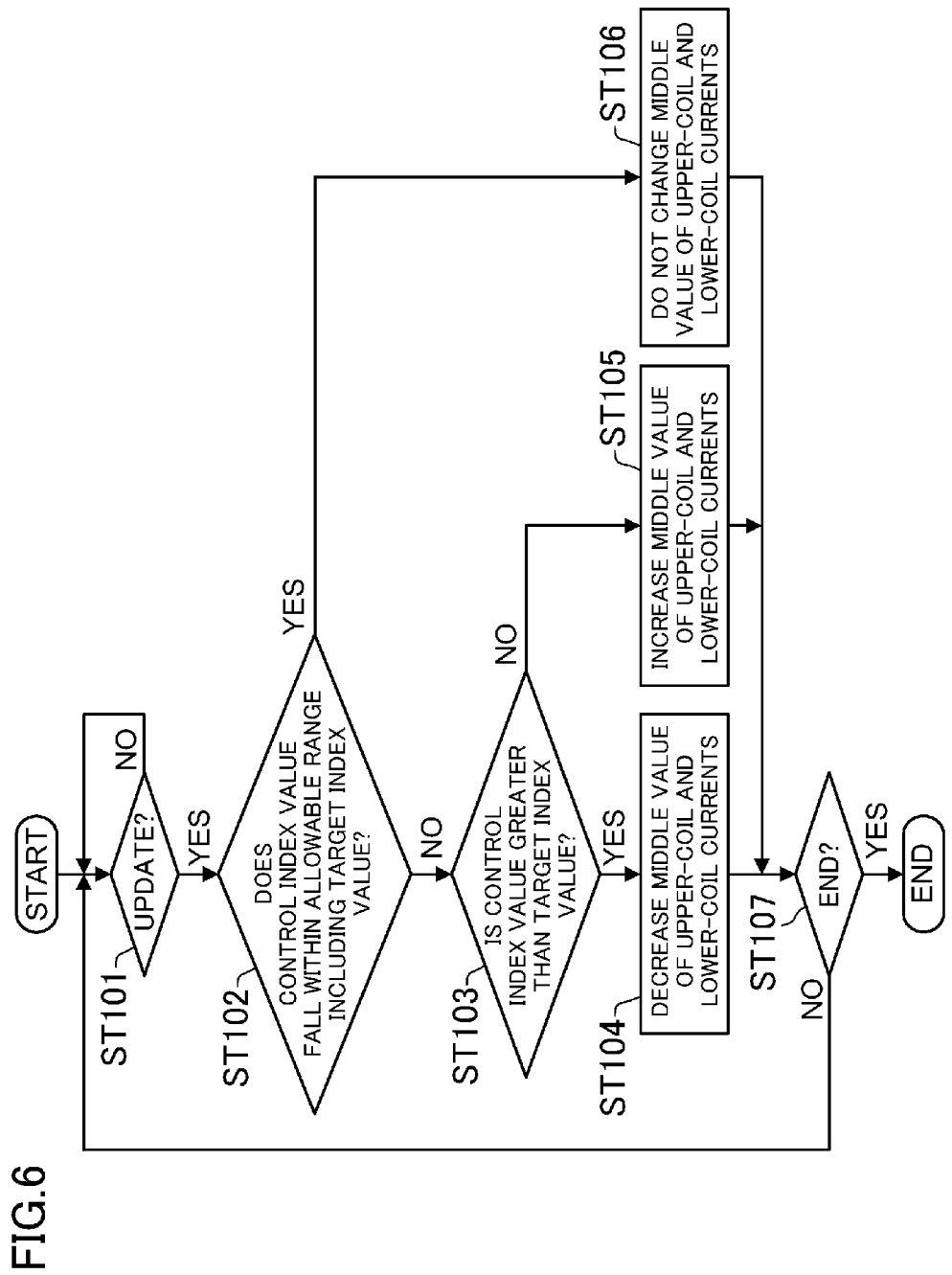

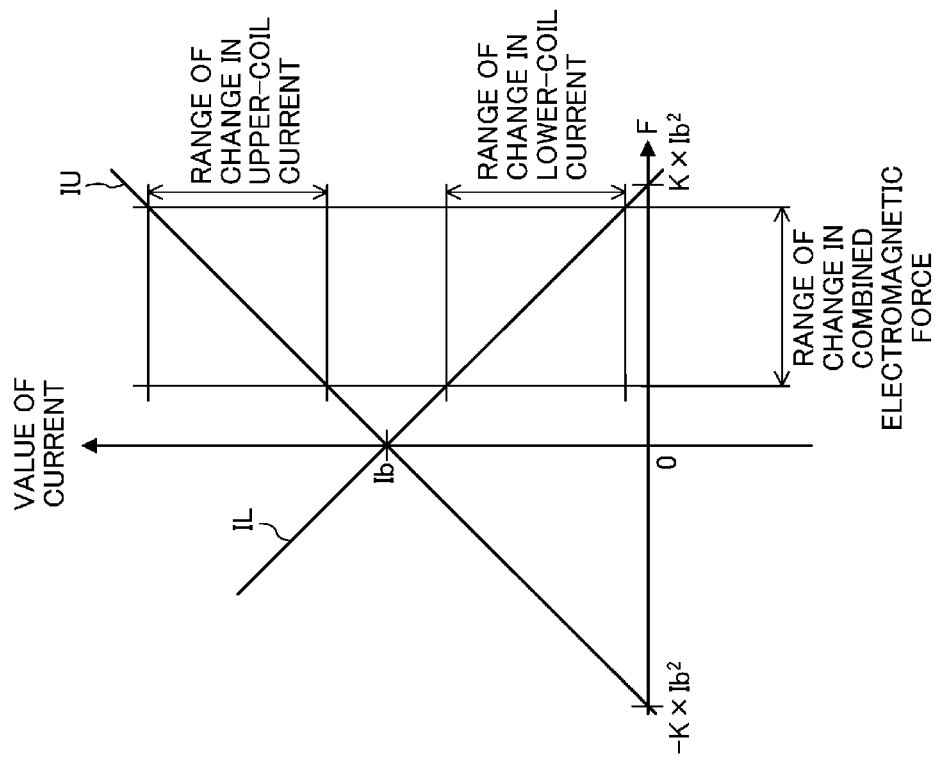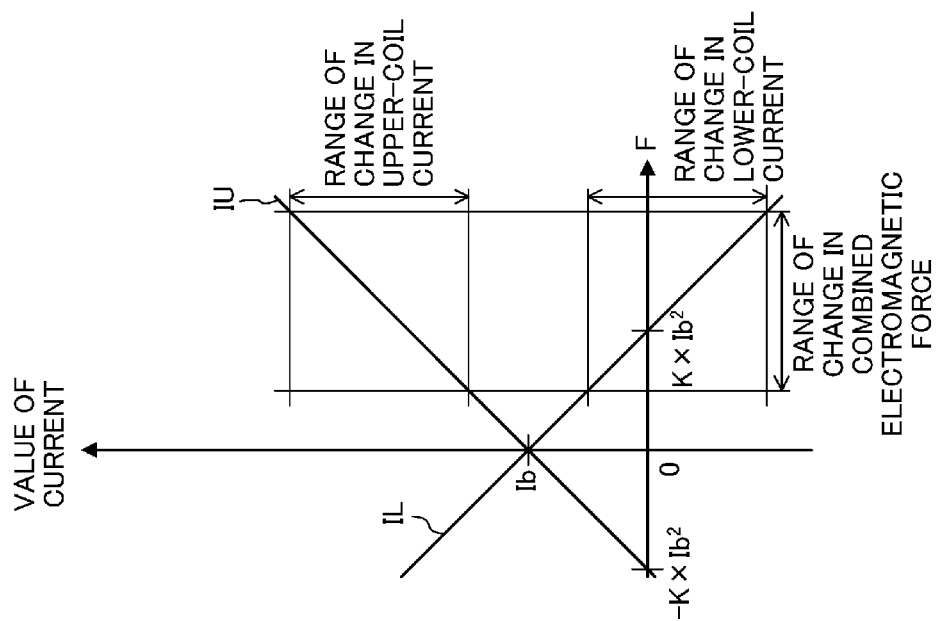

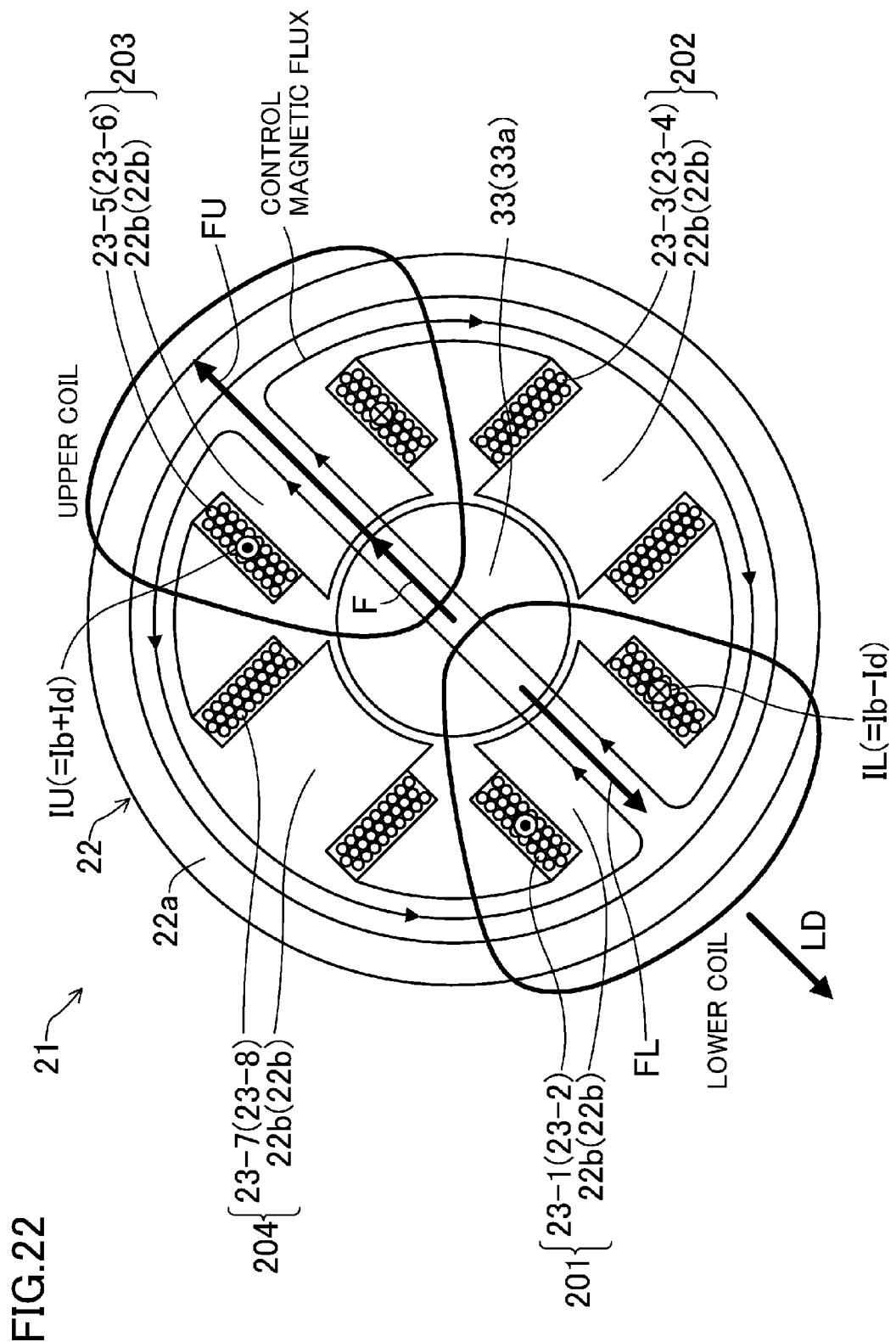

MAGNETIC BEARING DEVICE AND COMPRESSOR

TECHNICAL FIELD

The present invention relates to magnetic bearings, and more particularly, to control of a magnetic bearing.

BACKGROUND ART

A magnetic bearing which supports a rotating shaft by the sum of the electromagnetic forces (also referred to as a "combined electromagnetic force") of a plurality of electromagnets without contact is conventionally known in the art. In such a magnetic bearing, while a bias current (fixed current) is being passed through each of the coils of the electromagnets, a control current which is changed, depending on the position deviation of the drive shaft, is combined with the bias current so that the control current and the combined electromagnetic force have a linear relationship (see, for example, PATENT DOCUMENT 1 etc.).

CITATION LIST

Patent Document

PATENT DOCUMENT 1: Japanese Unexamined Patent Publication No. H10-141373

SUMMARY OF THE INVENTION

Technical Problem

In the above magnetic bearing, the position of the rotating shaft is controlled by controlling a coil current (upper-coil current) which is passed through the coil of an electromagnet for generating an electromagnetic force in a direction opposite to that of the load of the rotating shaft and a coil current (lower-coil current) which is passed through the coil of an electromagnet for generating an electromagnetic force in the same direction as that of the load of the rotating shaft.

However, if the middle value (e.g., the bias current) of the upper-coil and lower-coil currents is decreased in order to reduce the power consumption of the magnetic bearing, the value of the lower-coil current decreases, so that the degree of margin for error in controlling the magnetic bearing decreases, and therefore, the control performance of the magnetic bearing deteriorates. For example, as the value of the lower-coil current decreases, the frequency of occurrence of zero-crossing of the lower-coil current (the frequency at which the lower-coil current is zero) increases. In this case (particularly, a case where the coil current is controlled using the PWM switching technique), a dead time occurs due to the zero-crossing of the lower-coil current, so that the waveform of the lower-coil current is distorted, and therefore, it is difficult to maintain the linear relationship between the control current and the combined electromagnetic force. In addition, the distorted waveform of the lower-coil current causes high-frequency noise. Thus, it is difficult to reduce power consumption while reducing or preventing a deterioration in the control performance of the magnetic bearing.

Therefore, it is an object of the present invention to provide a magnetic bearing device which can reduce the power consumption thereof while reducing or preventing a deterioration in the control performance thereof.

Solution to the Problem

A magnetic bearing device according to an aspect of the present invention includes a magnetic bearing body (21) including at least one pair of control electromagnets (201, 203) facing each other with a supported portion (33a) of a rotating shaft (33) being interposed therebetween, and configured to support the rotating shaft (33) using a combined electromagnetic force (F) of the at least one pair of control electromagnets (201, 203) without contact, and a controller (11) configured to detect a control index value based on a first coil current (IL) passed through a coil of a first control electromagnet (201) of the pair of control electromagnets (201, 203) which generates an electromagnetic force in the same direction as that of a load (LD) exerted on the rotating shaft (33), the control index value being an index of the degree of margin for error in control depending on a value of the first coil current (IL), and control a middle value of a pair of coil currents (IU, IL) passed through the respective corresponding coils of the pair of control electromagnets (201, 203) so that the control index value approaches a predetermined target index value.

In the magnetic bearing device (10), when the control index value which is an index of the degree of margin for error in controlling the magnetic bearing device (10) is higher than the target index value (i.e., the degree of margin for error in control has a value higher than the desired value), the middle value of the pair of coil currents (IU, IL) decreases, and therefore, the power consumption of the magnetic bearing device (10) decreases. On the other hand, when the control index value is lower than the target index value (i.e., the degree of margin for error in control has a value lower than the desired value), the middle value of the pair of coil currents (IU, IL) increases, and therefore, the control performance of the magnetic bearing device (10) is improved.

Advantages of the Invention

As described above, by controlling the middle value of the pair of coil currents (IU, IL) so that the control index value which is an index of the degree of margin for error in controlling the magnetic bearing device (10) approaches the target index value, the power consumption of the magnetic bearing device (10) can be reduced while reducing or preventing a deterioration in the control performance thereof.

BRIEF DESCRIPTION OF THE DRAWINGS

FIG. 6 is a flowchart for describing operation of the magnetic bearing device.

FIGS. 8A and 8B are graphs showing a relationship between an upper-coil current and a lower-coil current, and a combined electromagnetic force.

FIG. 22 is a transverse cross-sectional view for describing a first variation of the magnetic bearing body.

DESCRIPTION OF EMBODIMENTS

Figure 1:
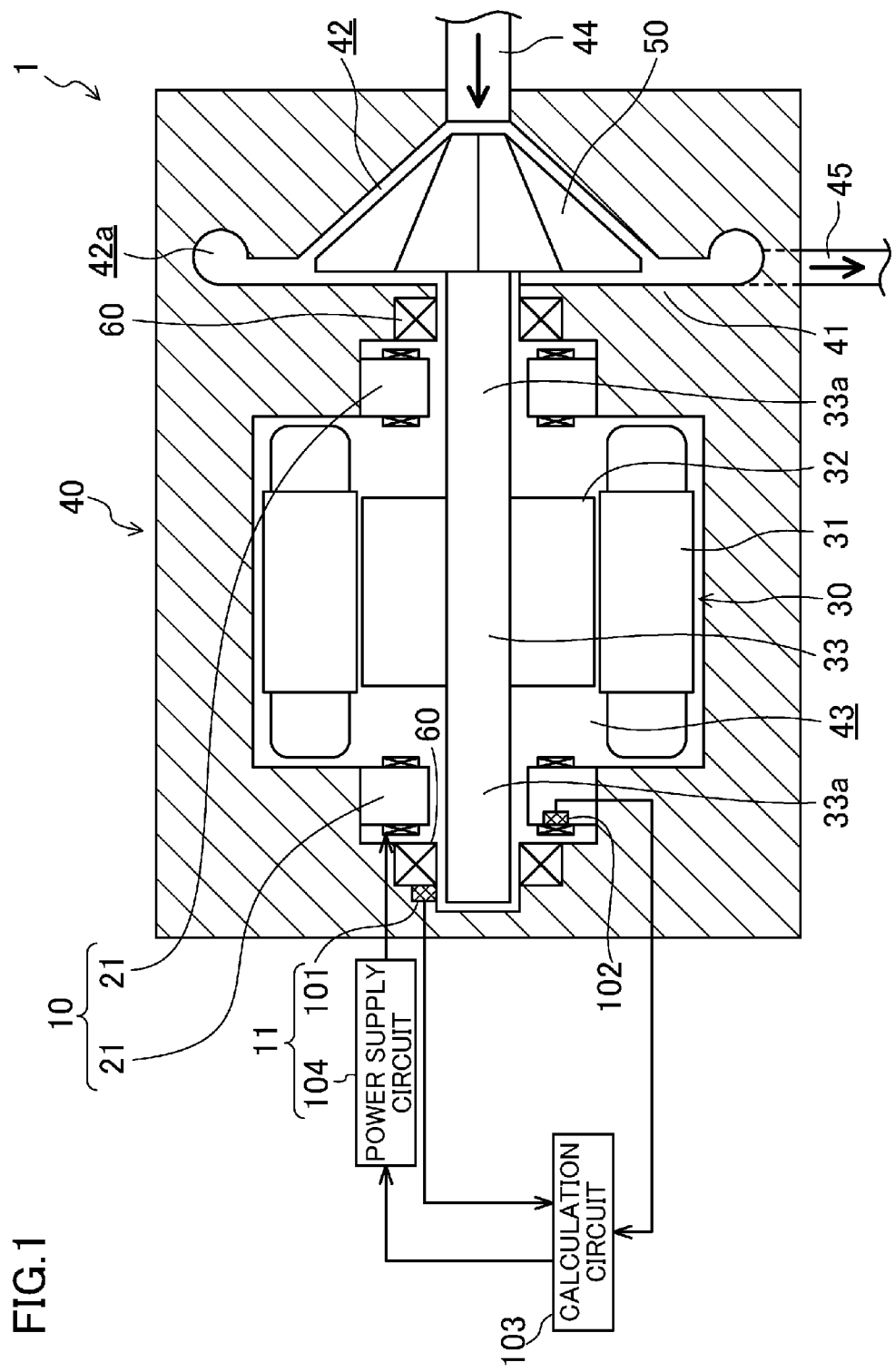
FIG. 1 is a diagram schematically showing an example configuration of a compressor including a magnetic bearing device.

Embodiments of the present invention will now be described in detail with reference to the accompanying drawings. Note that the same or corresponding parts are indicated by the same reference characters and will not be redundantly described.

(Compressor)

FIG. 1 shows an example configuration of a compressor (1) including a magnetic bearing device (10) according to an embodiment of the present invention. Here, the compressor (1) is a turbo compressor. The compressor (1) includes, in addition to the magnetic bearing device (10), an electric motor (30), a casing (40), an impeller (50), and two touchdown bearings (60, 60). The compressor (1) is, for example, connected to a refrigerant circuit (not shown) which performs refrigeration cycle operation by circulating a refrigerant, and used to compress the refrigerant.

The casing (40), which is formed in the shape of a cylinder whose opposite ends are closed, is positioned so that the axial line of the cylinder is horizontally oriented. A space in the casing (40) is partitioned by a wall portion (41). A space on the right side of the wall portion (41) forms an impeller chamber (42) which accommodates the impeller (50), and a space on the left side of the wall portion (41) forms an electric motor space (43) which accommodates the electric motor (30). A compression space (42a) which is in communication with the impeller chamber (42) is formed on an outer circumferential side of the impeller chamber (42). A suction pipe (44) for introducing an external gas (e.g., the refrigerant from the refrigerant circuit) into the impeller chamber (42), and a discharge pipe (45) for returning the high-pressure gas compressed in the impeller chamber (42) to the outside (e.g., the refrigerant circuit), are connected to the casing (40). The impeller (50) includes a plurality of blades which are arranged so that the impeller has a generally conical outer shape. The impeller (50) is accommodated in the impeller chamber (42).

The electric motor (30), which is accommodated in the casing (40), drives the impeller (50). In this example, the electric motor (30) is a so-called permanent-magnet synchronous motor. The electric motor (30) includes a stator (31), a rotor (32), and a drive shaft (33) (rotating shaft). The stator (31) is fixed to an inner circumferential wall of the casing (40). The rotor (32) is inserted in the stator (31), facing the stator (31) with a predetermined gap (distance) being interposed therebetween. The drive shaft (33) is fixed to the rotor (32) with the central axis thereof coinciding with the central axis of the rotor (32). The impeller (50) is fixed to one end of the drive shaft (33). The touchdown bearings (60, 60), which are, for example, ball bearings, support the drive shaft (33) when a current is not passed through the magnetic bearing device (10).

(Magnetic Bearing Device)

The magnetic bearing device (10) includes one or more (here, two) magnetic bearing bodies (21, 21) and a controller (11). The magnetic bearing bodies (21, 21) have the same configuration. The magnetic bearing body (21), which has at least one pair of control electromagnets facing each other with a supported portion (33a) of the drive shaft (33) being interposed therebetween, is configured to support the drive shaft (33) by the combined electromagnetic force (the sum of the electromagnetic forces) of the control electromagnets without contact as described below in detail. The controller (11) is configured to control operation of the magnetic bearing bodies (21, 21).

<Magnetic Bearing Body>

Figure 2:
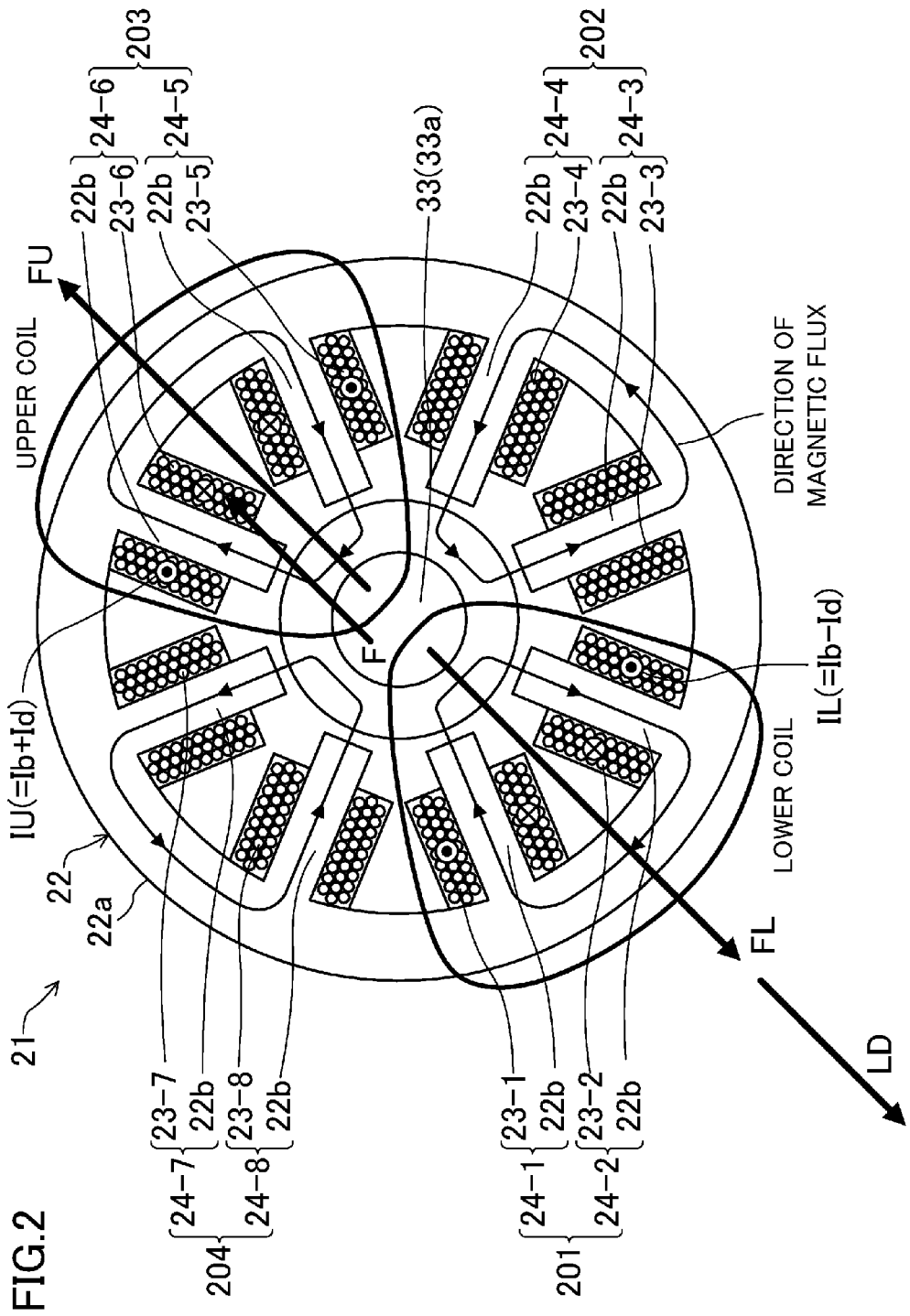
FIG. 2 is a transverse cross-sectional view for describing a magnetic bearing body.
Figure 3:
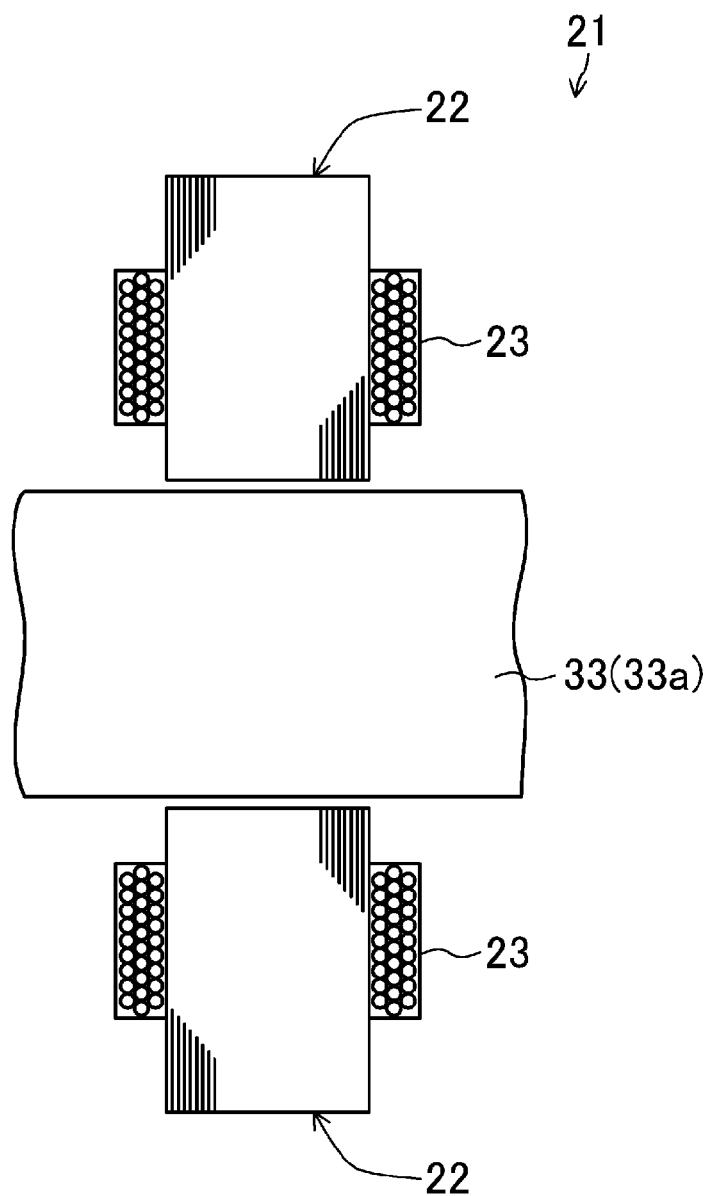
FIG. 3 is a longitudinal cross-sectional view for describing the magnetic bearing body.

Next, the magnetic bearing body (21) will be described with reference to FIGS. 2 and 3. FIG. 2 is a transverse cross-sectional view (a cross-sectional view perpendicular to the drive shaft) of the magnetic bearing body (21) of FIG. 1. FIG. 3 is a longitudinal cross-sectional view (a cross-sectional view in the drive shaft direction) of the magnetic bearing body (21) of FIG. 1. Note that, in the description that follows, the term "axial direction" refers to the direction in which a rotating shaft extends, i.e, the direction of the central axis of the drive shaft (33), and the term "radial direction" refers to a direction orthogonal to the axial direction of the drive shaft (33). The term "outer circumferential side" refers to a side which is further from the central axis of the drive shaft (33), and the term "inner circumferential side" refers to a side which is closer to the central axis of the drive shaft (33).

Here, the magnetic bearing body (21) is a heteropolar radial bearing. The magnetic bearing body (21) includes a core portion (22) and a plurality of (here, eight) coils (23-1, . . . , 23-8). Note that the coils (23-1, . . . , 23-8) are hereinafter collectively referred to as "the coils (23)."

<<Core Portion>>

The core portion (22) is formed of electromagnetic steel plates which are stacked one on top of another. The core portion (22) includes a back yoke portion (22a) and a plurality of (here, eight) tooth portions (22b, . . . , 22b). The back yoke portion (22a) has a generally tubular shape. The tooth portions (22b, . . . , 22b) are integrally formed with the back yoke portion (22a), protruding from an inner circumferential surface of the back yoke portion (22a) inward in the radial direction. The tooth portions (22b, . . . , 22b) are arranged along the inner circumference of the back yoke portion (22*a*) and equally spaced at a pitch of 45°. An innermost surface of the tooth portion (22*b*) faces the drive shaft (33) with a predetermined gap being interposed therebetween.

<<Coil>>

The eight coils (23-1, . . . , 23-8) are wound around the eight tooth portions (22*b*, . . . , 22*b*), respectively. As a result, eight electromagnets (24-1, . . . , 24-8) are formed. The coil (23-1) is connected to the coil (23-2). Therefore, when a coil current is passed through the coils (23-1, 23-2), an attraction force (electromagnetic force) is generated in the radial direction. Specifically, here, the two electromagnets (24-1, 24-2) form a control electromagnet (201) which generates an attraction force (electromagnetic force) in the radial direction. Similarly, the coils (23-3, 23-5, 23-7) are connected to the coils (23-4, 23-6, 23-8), respectively. As a result, these coil pairs form respective control electromagnets (202, 203, 204). Note that the directions in which the coils (23-1, . . . , 23-8) are wound and the directions of currents passed through the coils (23-1, . . . , 23-8) are set so that magnetic flux is generated in directions indicated by arrows in FIG. 2.

<<Control Electromagnet>>

The control electromagnets (201, 202) face the control electromagnets (203, 204), respectively, with the supported portion (33*a*) of the drive shaft (33) being interposed therebetween. Specifically, the control electromagnet (201) is paired with the control electromagnet (203), and the control electromagnet (202) is paired with the control electromagnet (204). The combined electromagnetic force of the control electromagnets (201, 203) can be controlled by controlling a pair of coil currents which are passed through the coils (23, 23) of the pair of control electromagnets (201, 203) (i.e., a coil current passed through the coils (23-1, 23-2) and a coil current passed through the coil (23-5, 23-6)). As a result, a position of the drive shaft (33) in the radial direction in which the control electromagnets (201, 203) face each other can be controlled. This holds true for the pair of control electromagnets (202, 204). Thus, the drive shaft (33) can be supported without contact.

<Coil Current>

Next, the coil currents passed through the coils (23-1, . . . , 23-8) of the control electromagnets (201, . . . , 204) will be described. Note that, in the description that follows, an "upper coil" refers to the coil (23) of the control electromagnet which generates an attraction force (electromagnetic force (FU)) whose direction is opposite to the direction of a load (LD) exerted on the drive shaft (33). A "lower coil" refers to the coil (23) of the control electromagnet which generates an attraction force (electromagnetic force (FL)) whose direction is the same as the direction of the load (LD). An "upper-coil current (IU)" refers to a coil current passed through the upper coil, and a "lower-coil current (IL)" refers to a coil current passed through the lower coil. Here, the terms "upper" and "lower" with respect to a coil are defined based on a relationship between the direction of the electromagnetic force and the direction of the load (LD), and may or may not match upper and lower positions of the magnetic bearing bodies (21, 21) as they are installed.

<<Upper-Coil Current and Lower-Coil Current>>

The upper-coil current (IU) and the lower-coil current (IL) each include a bias current (Ib) and a control current (Id).

The bias current (Ib) is used to establish a linear relationship between the value of the control current (Id) and the combined electromagnetic force (F). The bias current (Ib) has a value corresponding to the middle value of the upper-coil current (IU) and the lower-coil current (IL) (hereinafter referred to as "the middle value of the upper-coil and lower-coil currents (IU, IL)").

The control current (Id) is used to determine the direction and magnitude of the combined electromagnetic force (F). The control current (Id) included in the upper-coil current (IU) has a value corresponding to a difference value (positive value) between the middle value of the upper-coil and lower-coil currents (IU, IL) and the value of the upper-coil current (IU). The control current (Id) included in the lower-coil current (IL) has a value corresponding to a difference value (negative value) between the middle value of the upper-coil and lower-coil currents (IU, IL) and the value of the lower-coil current (IL).

The upper-coil current (IU) may be represented using the bias current (Ib) and the control current (Id) by:

$$IU = Ib + Id \tag{1}$$

The lower-coil current (IL) may be represented using the bias current (Ib) and the control current (Id) by:

$$IL = Ib - Id \tag{2}$$

The combined electromagnetic force (F) may be represented using the bias current (Ib) and the control current (Id) by:

$$F = K \times Ib \times Id \tag{3}$$

where "K" is a proportionality constant which is determined by the dimensions or structure of the magnetic bearing body (21).

The upper-coil current (IU) is derived from the expressions (1) and (3), i.e., may be represented using the bias current (Ib) and the combined electromagnetic force (F) by:

$$IU = Ib + \frac{F}{(K \times Ib)} \tag{4}$$

The lower-coil current (IL) is derived from the expressions (2) and (3), i.e., may be represented using the bias current (Ib) and the combined electromagnetic force (F) by:

$$IL = Ib - \frac{F}{(K \times Ib)} \tag{5}$$

<Controller>

The controller (11) performs the following process on each of combinations of control electromagnets (in FIG. 2, the combination of the control electromagnets (201, 203) and the combination of the control electromagnets (202, 204)). Specifically, the controller (11) controls a difference in value between the upper-coil current (IU) and the lower-coil current (IL) (hereinafter referred to as "the difference between the upper-coil and lower-coil currents (IU, IL)") to perform a position control on the drive shaft (33). The controller (11) also detects a control index value (e.g., an average value of the lower-coil current (IL)), and controls the middle value of the upper-coil and lower-coil currents (IU, IL) so that the control index value approaches a predetermined target index value (e.g., a target current value). The control index value may be an index of the degree of margin for error in controlling the magnetic bearing device (10). The degree of margin for error in controlling the magnetic bearing device (10) depends on the value of the lower-coil current (IL). For example, as the value of the lower-coil current (IL) decreases, the degree of margin for error in controlling the magnetic bearing device (10) decreases. The target index value may correspond to the control index value which occurs when the degree of margin for error in control has the desired value.

Note that, in the description that follows, it is assumed that, as shown in FIG. 2, the load (LD) is exerted on the drive shaft (33) in a direction from the control electromagnet (203) toward the control electromagnet (201). Specifically, an example case where a position (a position in the radial direction) of the drive shaft (33) is controlled using the combined electromagnetic force (F) of the control electromagnet (203) and the control electromagnet (201) will be described. In this case, the coils (23-5, 23-6) of the control electromagnet (203) correspond to the "upper coil," and the coils (23-1, 23-2) of the control electromagnet (201) correspond to the "lower coil."

<Details of Controller>

Figure 4:
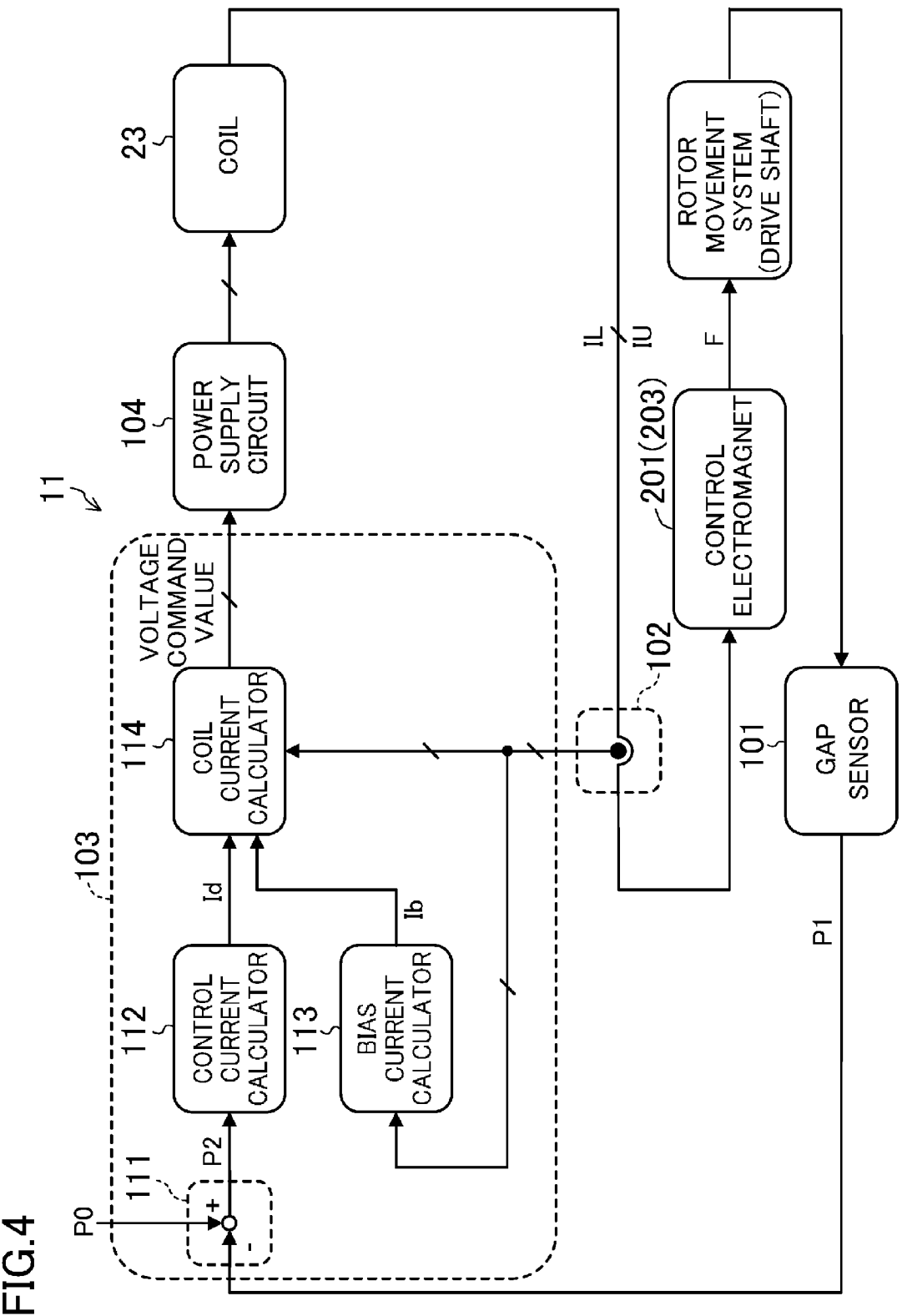
FIG. 4 is a block diagram for describing a controller.

Next, the controller (11) will be described in detail with reference to FIG. 4. The controller (11) includes a gap sensor (101), a current detector (102), a calculation circuit (103), and a power supply circuit (104). The gap sensor (101), the current detector (102), the calculation circuit (103), and the power supply circuit (104) perform the following process on each of the combinations of the control electromagnets in FIG. 2, the combination of the control electromagnets (201, 203) and the combination of the control electromagnets (202, 204)). The process performed on the combination of the control electromagnets (201, 203) will now be described as an example.

<<Gap Sensor and Current Detector>>

The gap sensor (101) is configured to detect a position in the radial direction of the drive shaft (33) (drive shaft position (P1)). The gap sensor (101) is, for example, attached to the casing (40). The current detector (102) is configured to detect the values of the upper-coil current (IU) and the lower-coil current (IL).

<<Calculation Circuit>>

The calculation circuit (103) determines set values of the upper-coil current (IU) and the lower-coil current (IL) (hereinafter referred to as "the set values of the upper-coil and lower-coil currents (IU, IL)") based on the drive shaft position (P1) detected by the gap sensor (101). The calculation circuit (103) also corrects the set values of the upper-coil and lower-coil currents (IU, IL) based on the control index value (e.g., an average value of the lower-coil current (IL)). The calculation circuit (103) also outputs an upper voltage command value and a lower voltage command value corresponding to the upper coil and the lower coil based on the set values of the upper-coil and lower-coil currents (IU, IL), respectively. Here, the calculation circuit (103) includes a position deviation calculator (111), a control current calculator (112), a bias current calculator (113), and a coil current calculator (114).

—Position Deviation Calculator—

The position deviation calculator (111) outputs, as a position deviation value (P2), a difference value between the drive shaft position (P1) detected by the gap sensor (101) and a target position (P0) (a target position in the radial direction of the drive shaft (33)) indicated by an external position command. For example, the position deviation calculator (111) calculates the position deviation value (P2) by subtracting the drive shaft position (P1) from the target position (P0).

—Control Current Calculator—

The control current calculator (112) periodically updates the value (set value) of the control current (Id) based on the position deviation value (P2) from the position deviation calculator (111). For example, the control current calculator (112) sets the control current (Id) to be positive or negative based on whether the position deviation value (P2) is positive or negative, and sets the absolute value of the control current (Id) to increase with an increase in the absolute value of the position deviation value (P2). Thus, by setting the control current (Id) based on the position deviation value (P2), the drive shaft position (P1) can be caused to approach the target position (P0).

—Bias Current Calculator—

The bias current calculator (113) detects the control index value (e.g., an average value of the lower-coil current (IL)) based on the value of the lower-coil current (IL) detected by the current detector (102). The bias current calculator (113) also periodically updates the value (set value) of the bias current (Ib) so that the control index value approaches a target index value (e.g., a target current value).

—Coil Current Calculator—

The coil current calculator (114) determines the set values of the upper-coil and lower-coil currents (IU, IL) based on the control current (Id) set by the control current calculator (112) and the bias current (Ib) set by the bias current calculator (113). For example, the coil current calculator (114) determines the set values of the upper-coil and lower-coil currents (IU, IL) based on the expressions (1) and (2).

The coil current calculator (114) also outputs an upper voltage command value and a lower voltage command value corresponding to the upper and lower coils based on the set values of the upper-coil and lower-coil currents (IU, IL), respectively. The upper voltage command value indicates the set value of an upper-coil voltage applied to an upper coil (e.g., the coils (23-5, 23-6)), and the lower voltage command value indicates the set value of a lower-coil voltage applied to a lower coil (e.g., the coils (23-1, 23-2)). The coil current calculator (114) also performs a feedback control on the upper and lower voltage command values to cause the values of the upper-coil current (IU) and the lower-coil current (IL) (hereinafter referred to as "the detected values of the upper-coil and lower-coil currents (IU, IL)) detected by the current detector (102) to be equal to the set values of the upper-coil and lower-coil currents (IU, IL), respectively.

<<Power Supply Circuit>>

Figure 5:
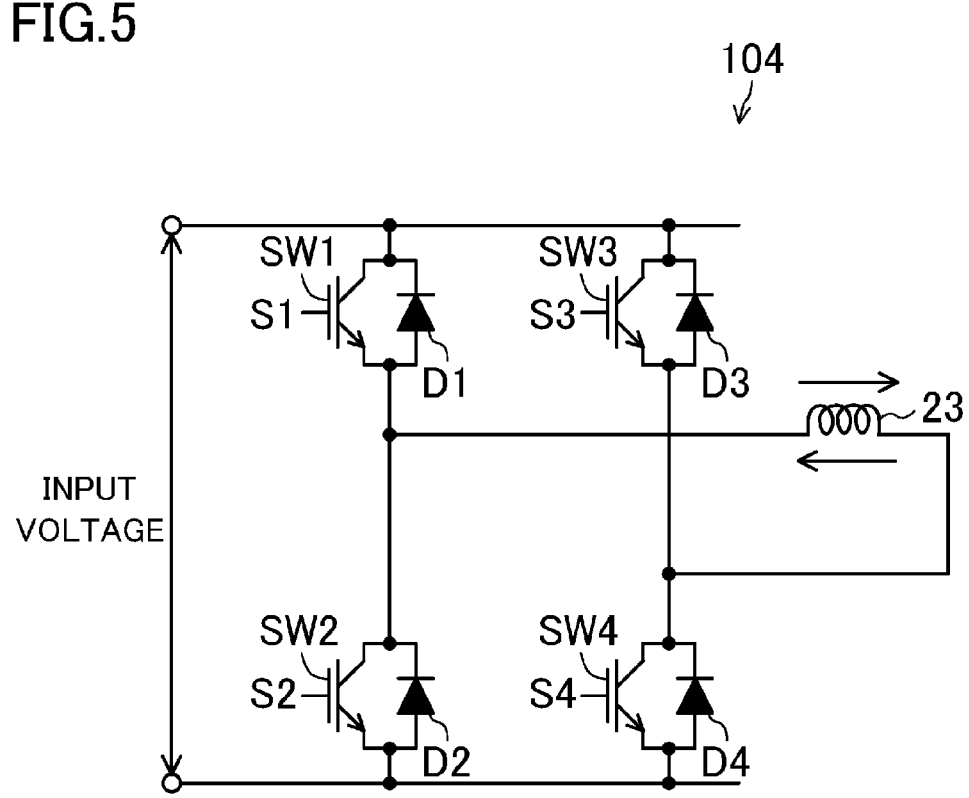
FIG. 5 is a circuit diagram for describing an example configuration of a power supply circuit.

The power supply circuit (104) applies an upper-coil voltage and a lower-coil voltage to an upper coil (e.g., the coils (23-5, 23-6)) and a lower coil (e.g., the coils (23-1, 23-2)), respectively. The power supply circuit (104) also changes the values of the upper-coil and lower-coil voltages based on the upper and lower voltage command values from the calculation circuit (103), respectively. As a result, the values of the upper-coil current (IU) and the lower-coil current (IL) passed through the upper and lower coils can be changed to the set values of the upper-coil and lower-coil currents (IU, IL) set by the calculation circuit (103), respectively. For example, the power supply circuit (104) may include an inverter circuit, such as that shown in FIG. 5, for each of the upper and lower coils. The inverter circuit of FIG. 5 includes four switching elements (SW1, . . . , SW4) and four rectification elements (D1, . . . , D4). The switching elements (SW1, . . . , SW4) are turned on and off using PWM signals (S1, . . . , S4). In the inverter circuit, the direction of a current passed through the coil (23) can be changed.

Thus, by updating the control current (Id), the difference between the upper-coil and lower-coil currents (IU, IL) can be changed. Also, by updating the bias current (Ib), the middle value of the upper-coil and lower-coil currents (IU, IL) can be changed.

(Operation)

Next, operation of the magnetic bearing device (10) will be described with reference to FIG. 6. Here, a control of the middle value of the upper-coil and lower-coil currents (IU, IL) by the controller (11) will be described in detail.

<Step (ST101)>

Initially, the bias current calculator (113) determines whether or not it is time to update the bias current (Ib). If it is time to update the bias current (Ib), control proceeds to step (ST102). Otherwise, step (ST101) is repeated.

<Step (ST102)>

Next, the bias current calculator (113) detects the control index value (e.g., an average value of the lower-coil current (IL)), and determines whether or not the control index value falls within an allowable range. The allowable range includes a target index value (e.g., a target current value) which is a criterion for the control index value. If the control index value falls within the allowable range, control proceeds to step (ST106). Otherwise, control proceeds to step (ST103).

<Step (ST103)>

Next, the bias current calculator (113) determines whether or not the control index value is greater than the target index value. If the control index value is greater than the target index value, control proceeds to step (ST104). Otherwise, control proceeds to step (ST105).

<Step (ST104)>

Next, the bias current calculator (113) decreases the value of the bias current (Ib). At this time, the bias current calculator (113) may change the bias current (Ib) so that the decrease in the bias current (Ib) becomes greater as a difference value between the control index value and the target index value increases. The coil current calculator (114) decreases the set values of the upper-coil and lower-coil currents (IU, IL) based on the decrease in the bias current (Ib). As a result, the upper and lower voltage command values are updated to change the values of the upper-coil current (IU) and the lower-coil current (IL) so that the middle value of the upper-coil and lower-coil currents (IU, IL) decrease. Next, control proceeds to step (ST107).

<Step (ST105)>

On the other hand, if it is determined in step (ST103) that the control index value is smaller than the target index value, the bias current calculator (113) increases the value of the bias current (Ib). At this time, the bias current calculator (113) may change the bias current (Ib) so that the increase in the bias current (Ib) becomes greater as the difference value between the control index value and the target index value increases. The coil current calculator (114) increases the set values of the upper-coil and lower-coil currents (IU, IL) based on the increase in the bias current (Ib). As a result, the upper and lower voltage command values are updated to change the values of the upper-coil current (IU) and the lower-coil current (IL) so that the middle value of the upper-coil and lower-coil currents (IU, IL) increases. Next, control proceeds to step (ST107).

<Step (ST106)>

Also, if it is determined in step (ST102) that the control index value falls within the allowable range, the bias current calculator (113) does not change, i.e., maintains the value of the bias current (Ib). Therefore, the coil current calculator (114) does not change, i.e., maintains the set values of the upper-coil and lower-coil currents (IU, IL). As a result, the middle value of the upper-coil and lower-coil currents (IU, IL) is not changed, i.e., is maintained. Next, control proceeds to step (ST107).

<Step (ST107)>

Next, if the control of the middle value of the upper-coil and lower-coil currents (IU, IL) is continued, control proceeds to step (ST101). Otherwise, the control of the middle value of the upper-coil and lower-coil currents (IU, IL) is ended.

(Specific Example Operation of Magnetic Bearing Device)

Figure 7A:
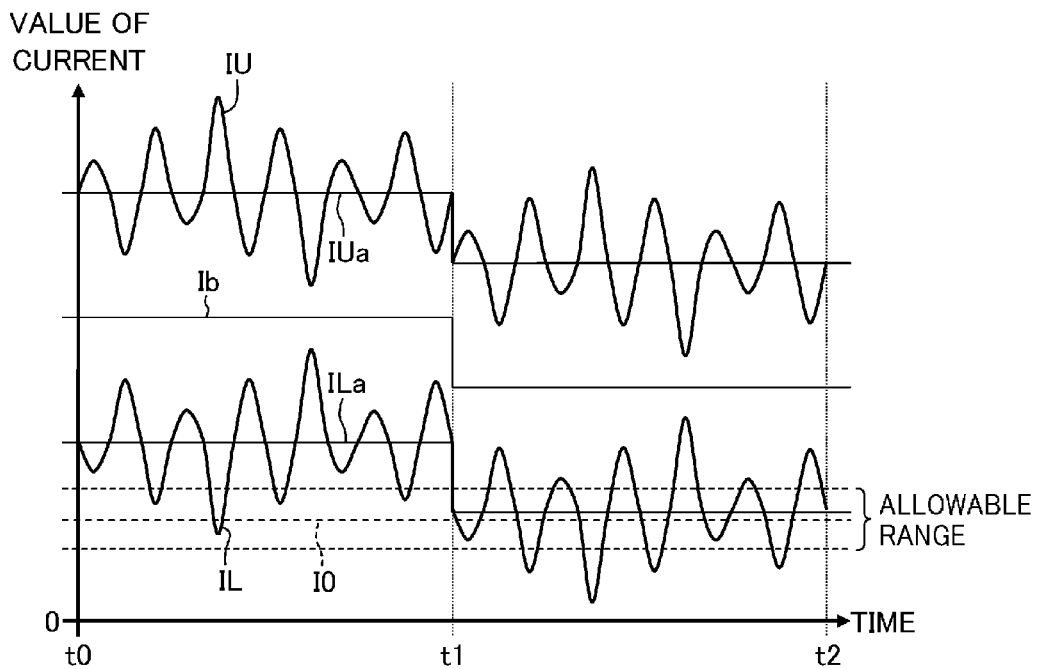
FIGS. 7A and 7B are timing charts for describing operation of the magnetic bearing device.
Figure 7B:
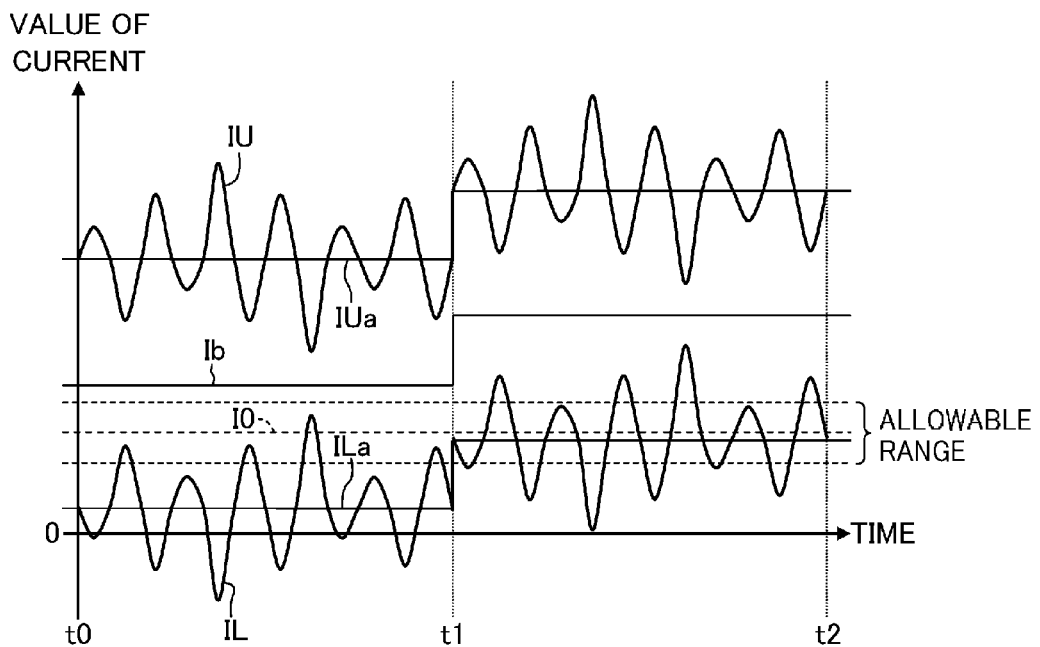

Next, operation (the control of the middle value of the upper-coil and lower-coil currents (IU, IL) by the controller (11)) of the magnetic bearing device (10) will be specifically described with reference to FIGS. 7A and 7B. Here, the control index value is an average value of the lower-coil current (IL) (here, an average value (ILa) over each predetermined period of time), and the target index value of the lower-coil current (IL) is a target current value (I0). For example, the target current value (I0) corresponds to an average value of the lower-coil current (IL) (here, the average value (ILa) over each predetermined period of time) which occurs when the degree of margin for error in control has the desired value.

<Case where Control Index Value is Higher than Target Index Value>

Firstly, a case where the average value (I0) of the lower-coil current (IL) exceeds the allowable range will be described with reference to FIG. 7A. Here, the middle value of the upper-coil and lower-coil currents (IU, IL) is updated at times (t0, t1, t2).

At time (t1) (update timing), the bias current calculator (113) detects the average value (ILa) of the lower-coil current (IL) over the period of time from time (t0) to time (t1) based on the values of the lower-coil current (IL) which has been detected by the current detector (102) over the period of time from time (t0) to time (t1). At this time, the average value (ILa) of the lower-coil current (IL) exceeds the allowable range, and therefore, the bias current calculator (113) decreases the value of the bias current (Ib). As a result, at time (t1), the middle value of the upper-coil and lower-coil currents (IU, IL) decreases.

At time (t2) (update timing), the bias current calculator (113) detects the average value (ILa) of the lower-coil current (IL) over the period of time from time (t1) to time (t2). At this time, the average value (ILa) of the lower-coil current (IL) falls within the allowable range, and therefore, the bias current calculator (113) does not change, i.e., maintains the value of the bias current (Ib). As a result, at time (t2), the middle value of the upper-coil and lower-coil currents (IU, IL) is not changed, i.e., is maintained.

<Case Where Control Index Value is Lower Than Target Index Value>

Next, a case where the average value (ILa) of the lower-coil current (IL) falls below the allowable range will be described with reference to FIG. 7B. Here, the middle value of the upper-coil and lower-coil currents (IU, IL) is updated at times (t0, t1, t2).

At time (t1) (update timing), the bias current calculator (113) detects the average value (ILa) of the lower-coil current (IL) over the period of time from time (t0) to time (t1). At this time, the average value (ILa) of the lower-coil current (IL) falls below the allowable range, and therefore, the bias current calculator (113) increases the value of the bias current (Ib). As a result, at time (t1), the middle value of the upper-coil and lower-coil currents (IU, IL) increases.

At time (t2) (update timing), the bias current calculator (113) detects the average value (ILa) of the lower-coil current (IL) over the period of time from time (t1) to time (t2). At this time, the average value (ILa) of the lower-coil current (IL) falls within the allowable range, and therefore, the bias current calculator (113) does not change, i.e., maintains the value of the bias current (Ib). As a result, at time (t2), the middle value of the upper-coil and lower-coil currents (IU, IL) is not changed, i.e., is maintained.

(Relationship Between Bias Current and Range of Change in Lower-Coil Current)

Here, a relationship between the upper-coil current (IU) and the lower-coil current (IL), and the combined electromagnetic force (F), will be described with reference to FIGS. 8A and 8B. Note that the range of a change in the combined electromagnetic force (F) is the same in FIGS. 8A and 8B.

In the case of FIG. 8A, when the combined electromagnetic force (F) is changed within the change range shown in FIG. 8A, the value of the lower-coil current (IL) changes between positive and negative, i.e., crosses zero. In this case, a zero-crossing occurs in the lower-coil current (IL). In particular, when the coil current is controlled using an inverter circuit, such as that shown in FIG. 5 (i.e., the coil current is controlled by the PWM switching technique), a dead time occurs due to the zero-crossing of the lower-coil current (IL), so that the waveform of the lower-coil current (IL) is distorted, and therefore, the PWM duty ratio and the lower-coil current (IL) have a non-linear relationship. Therefore, it is difficult to maintain the linear relationship between the control current (Id) and the combined electromagnetic force (F). Also, the distortion of the waveform of the lower-coil current causes high-frequency noise. Note that as the value of the lower-coil current (IL) decreases, the frequency of occurrence of the zero-crossing of the lower-coil current (IL) increases. Thus, the decrease in the value of the lower-coil current (IL) causes a decrease in the degree of margin for error in controlling the magnetic bearing device (10), and therefore the control performance of the magnetic bearing device (10) deteriorates.

Here, as shown in FIG. 8B, the change range of the lower-coil current (IL) can be caused to exceed zero by increasing the value of the bias current (Ib). By setting the value of the bias current (Ib) as shown in FIG. 8B, the occurrence of the zero-crossing of the lower-coil current (IL) can be reduced or prevented. Specifically, the increase in the value of the lower-coil current (IL) causes an increase in the degree of margin for error in controlling the magnetic bearing device (10), and therefore, the control performance of the magnetic bearing device (10) is improved.

(Advantages)

As described above, in the magnetic bearing device (10) of this embodiment, when the control index value which is an index of the degree of margin for error in controlling the magnetic bearing device (10) is higher than the target index value (i.e., the degree of margin for error in control has a value higher than the desired value), the middle value of the upper-coil and lower-coil currents (IU, IL) decreases, resulting in a decrease in the power consumption of the magnetic bearing device (10). On the other hand, when the control index value is lower than the target index value (i.e., the degree of margin for error in control has a value lower than the desired value), the middle value of the upper-coil and lower-coil currents (IU, IL) increases, resulting in an improvement in the control performance of the magnetic bearing device (10). Thus, by controlling the middle value of the upper-coil and lower-coil currents (IU, IL) so that the control index value which is an index of the degree of margin for error in controlling the magnetic bearing device (10) approaches the target index value, the power consumption of the magnetic bearing device (10) can be reduced while reducing the deterioration in the control performance thereof.

Also, by controlling the middle value of the upper-coil and lower-coil currents (IU, IL) so that the middle value of the upper-coil and lower-coil currents (IU, IL) is not changed when the control index value falls within the allowable range, the stability of the control of the middle value of the upper-coil and lower-coil currents (IU, IL) can be improved.

Also, by controlling the amount of the change in the bias current (Ib) so that the amount of a change in the bias current (Ib) increases with an increase in the difference value between the control index value and the target index value, the time it takes to control the middle value of the upper-coil and lower-coil currents (IU, IL) to converge can be reduced.

(First Variation of Control Index Value)

Figure 9A:
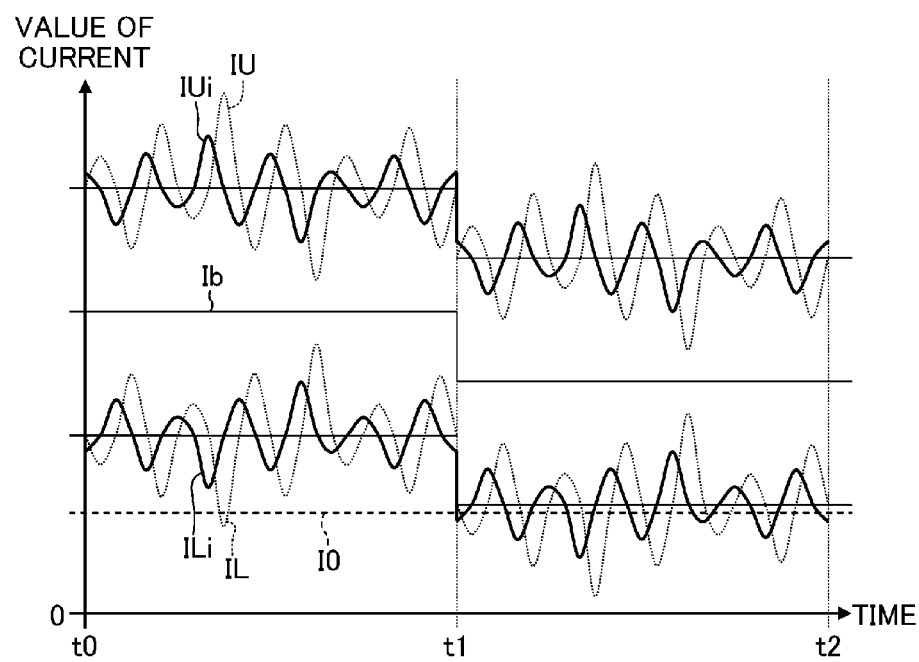
FIGS. 9A and 9B are timing charts for describing a first variation of a control index value.
Figure 9B:
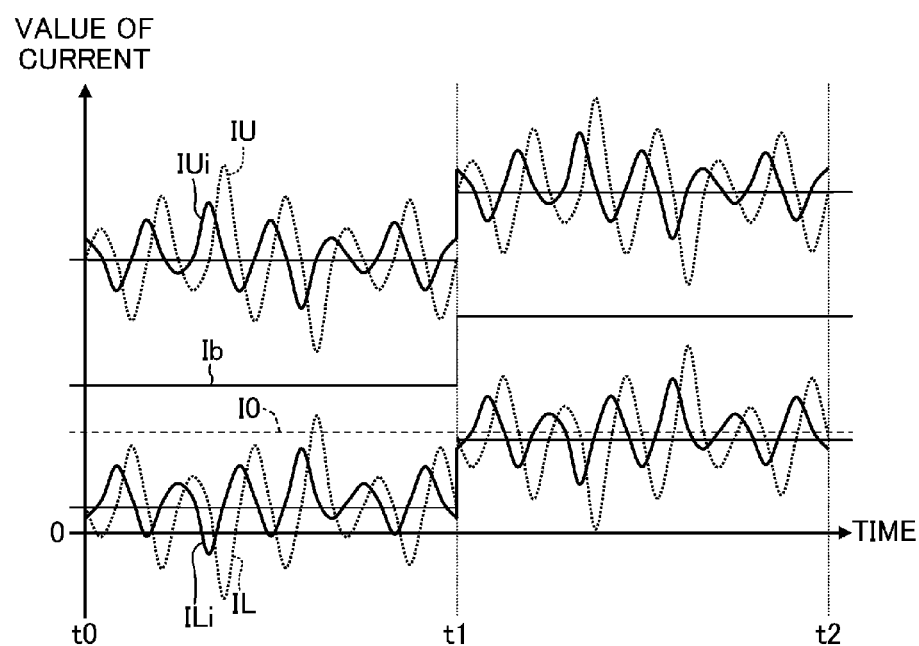

Note that, as shown in FIGS. 9A and 9B, the controller (11) may detect an integral average value (ILi) of the lower-coil current (IL) as the control index value. In this case, the target index value of the lower-coil current (IL) may be the target current value (I0) (e.g., a value corresponding to the integral average value (ILi) of the lower-coil current (IL) which occurs when the degree of margin for error in control has the desired value).

For example, the bias current calculator (113) may update the integral average value (ILi) of the lower-coil current (IL) by integrating and averaging the values of the lower-coil current (IL) each time the current detector (102) detects the value of the lower-coil current (IL).

As described above, an average value of the lower-coil current (IL) (a direct-current component of the lower-coil current (IL)) which is the control index value may be the average value (ILa) which is calculated over each predetermined period of time of the lower-coil current (IL), or the integral average value (ILi) of the lower-coil current (IL).

(Second Variation of Control Index Value)

Figure 10A:
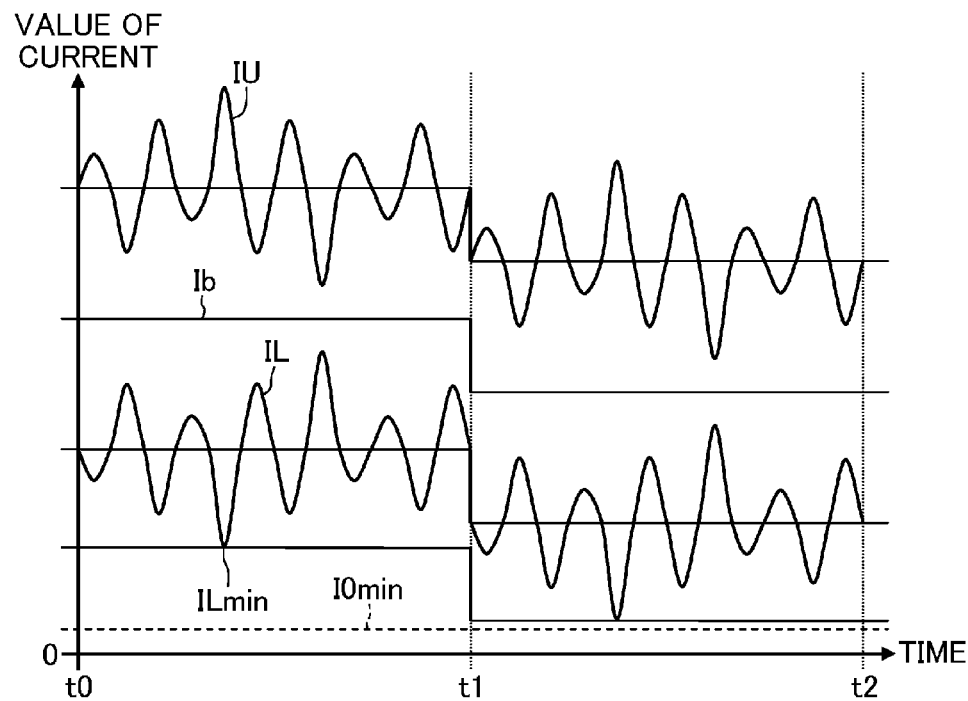
FIGS. 10A and 10B are timing charts for describing a second variation of the control index value.
Figure 10B:
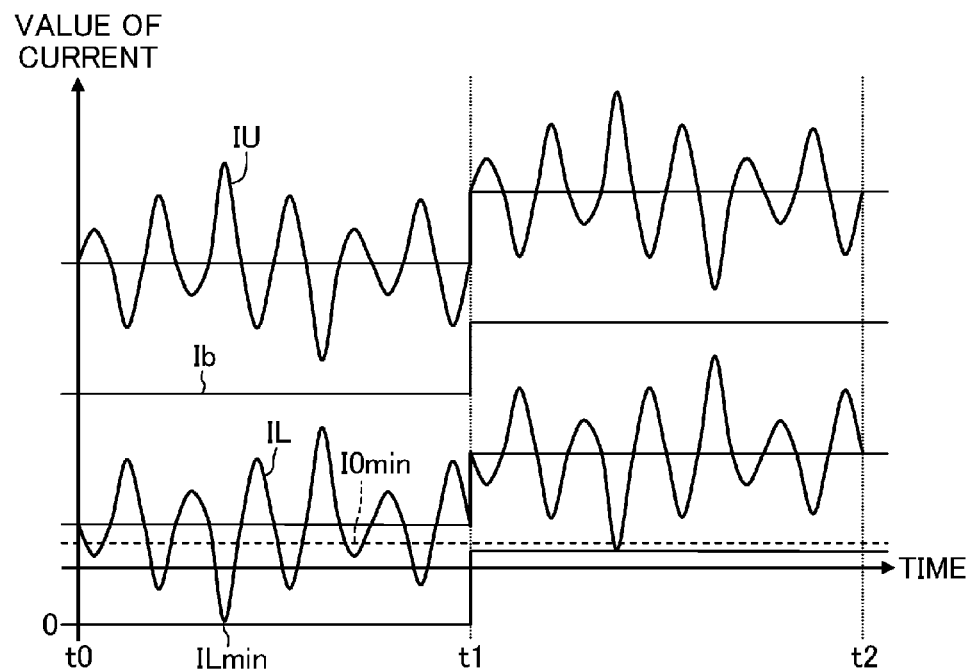

As shown in FIGS. 10A and 10B, the controller (11) may detect a minimum value (ILmin) of the lower-coil current (IL) during a predetermined period of time as the control index value. In this case, the target index value of the lower-coil current (IL) may be a target minimum value (ILmin) (e.g., a value corresponding to the minimum value (ILmin) of the lower-coil current (IL) which occurs when the degree of margin for error in control has the desired value).

For example, at time (t1) (update timing), the bias current calculator (113) may detect a minimum value of the values of the lower-coil current (IL) detected by the current detector (102) during the period of time from time (t0) to time (t1), as the minimum value (ILmin) of the lower-coil current (IL) during the period of time from time (t0) to time (t1).

(Third Variation of Control Index Value)

Figure 11A:
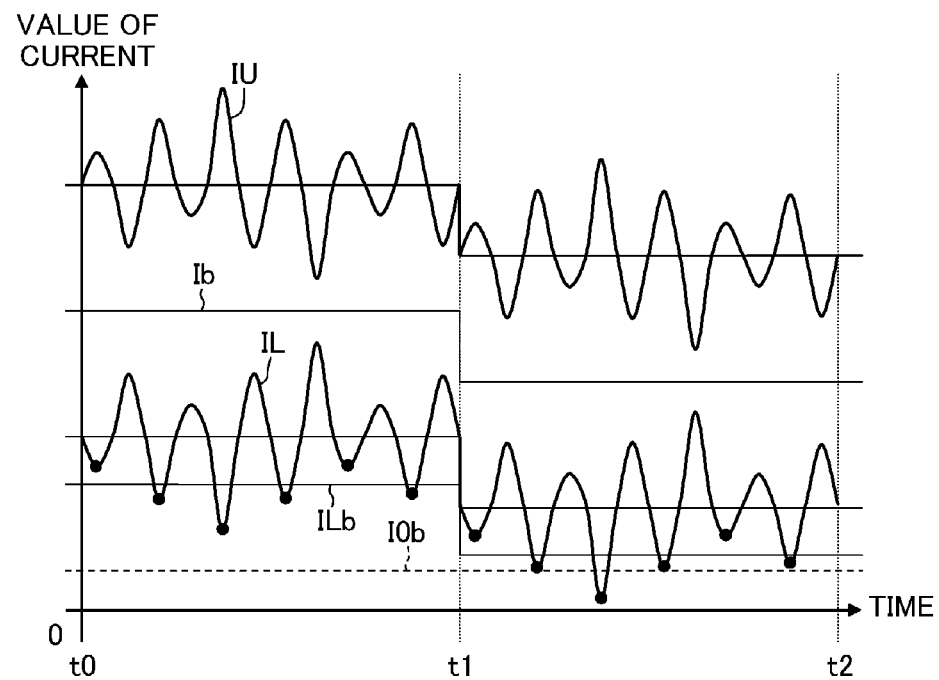
FIGS. 11A and 11B are timing charts for describing a third variation of the control index value.
Figure 11B:
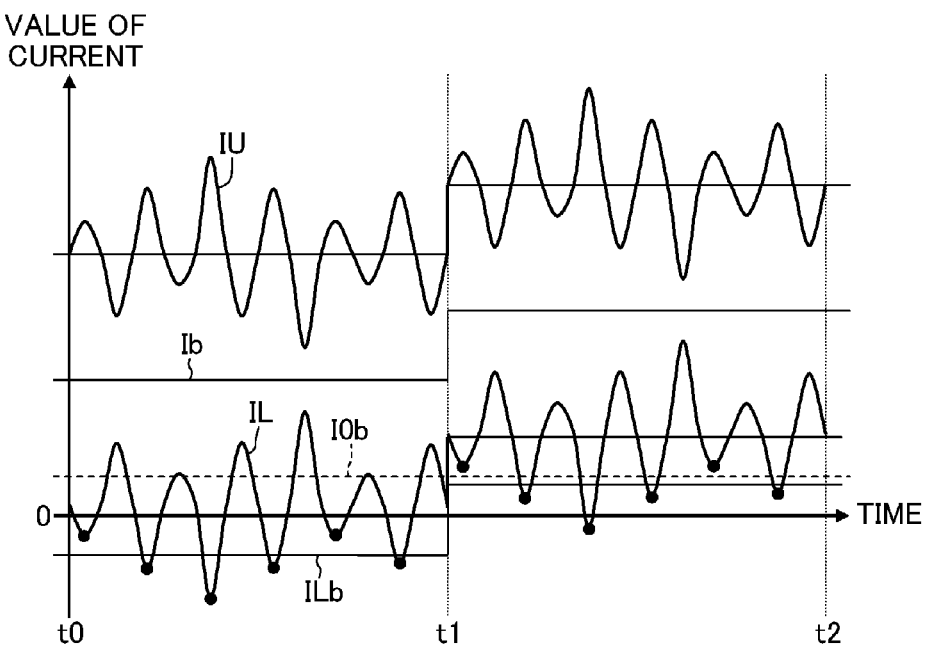

As shown in FIGS. 11A and 11B, the controller (11) may detect an average value (ILb) of local minimum values of the lower-coil current (IL) during a predetermined period of time as the control index value. In this case, the target index value of the lower-coil current (IL) may be a target average value (I0b) (e.g., the average value (ILb) of local minimum values of the lower-coil current (IL) which occur when the degree of margin for error in control has the desired value).

For example, at time (t1) (update timing), the bias current calculator (113) may detect local minimum values (closed circles in FIGS. 11A and 11B) from the values of the lower-coil current (IL) detected by the current detector (102) over the period of time from time (t0) to time (t1), and may detect an average value of the local minimum values as the average value (ILb) of local minimum values of the lower-coil current (IL) during the period of time from time (t0) to time (t1).

(Fourth Variation of Control Index Value)

Figure 12A:
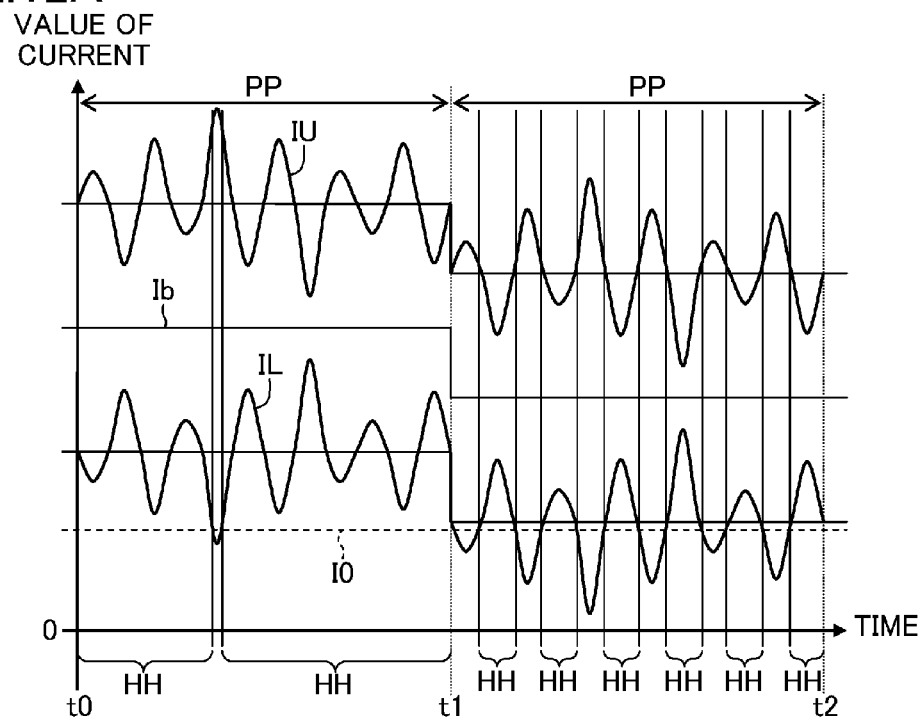
FIGS. 12A and 12B are timing charts for describing a fourth variation of the control index value.
Figure 12B:
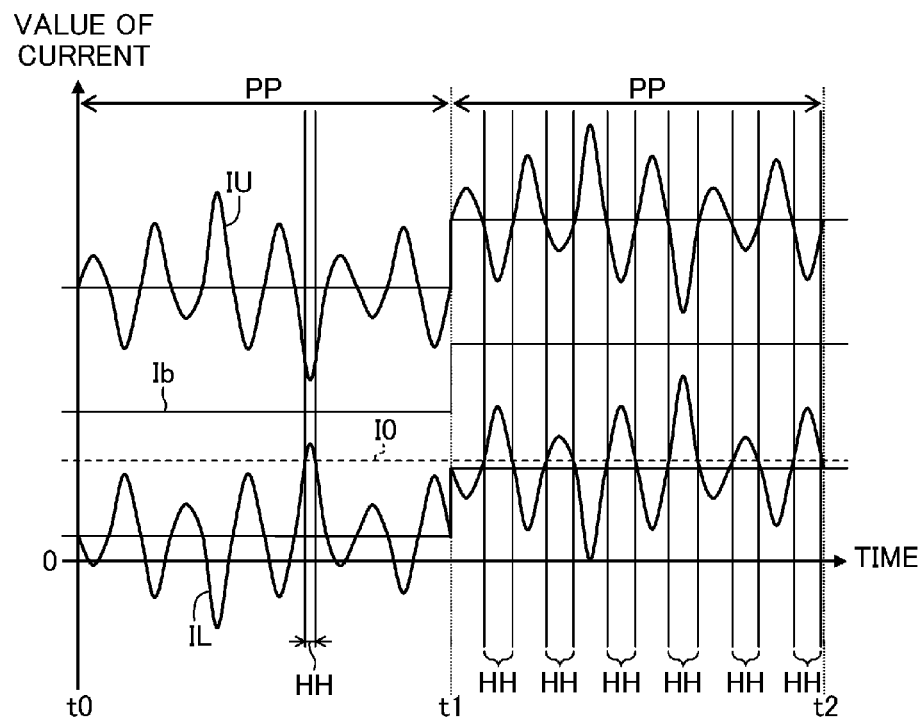

As shown in FIGS. 12A and 12B, the controller (11) may detect, as the control index value, the time proportion of a high-level period (HH) during which the value of the lower-coil current (IL) is higher than the target current value (I0) within a predetermined period of time (the time proportion of the high-level period (HH) to the predetermined period (PP)). In this case, the target index value of the lower-coil current (IL) may be a target time proportion (e.g., a time proportion corresponding to the time proportion of the high-level period to the predetermined period (PP) when the degree of margin for error in control has the desired value). Note that, in FIGS. 12A and 12B, the target time portion is set to about 50%.

For example, the bias current calculator (113) may detect the time proportion of the high-level period (HH) to the predetermined period (PP) as follows. Specifically, at time (t0) (update timing), the bias current calculator (113) resets the count value of the high-level period (HH), starts counting the high-level period (HH) when the value of the lower-coil current (IL) exceeds the target current value (I0), and temporarily stops counting the high-level period (HH) when the value of the lower-coil current (IL) falls below the target current value (I0). Next, at time (t1) (update timing), the bias current calculator (113) detects the count value of the high-level period (HH) over the period of time from time (t0) to time (t1), as the time proportion of the high-level period (HH) during the period of time from time (t0) to time (t1).

Although, in FIGS. 12A and 12B the high-level period (HH) is defined as a period of time during which an instantaneous value of the lower-coil current (IL) is higher than the target current value (I0), the high-level period (HH) may be defined as a period of time during which the integral average value (ILi) of the lower-coil current (IL) is higher than the target current value (I0).

(Fifth Variation of Control Index Value)

Figure 13A:
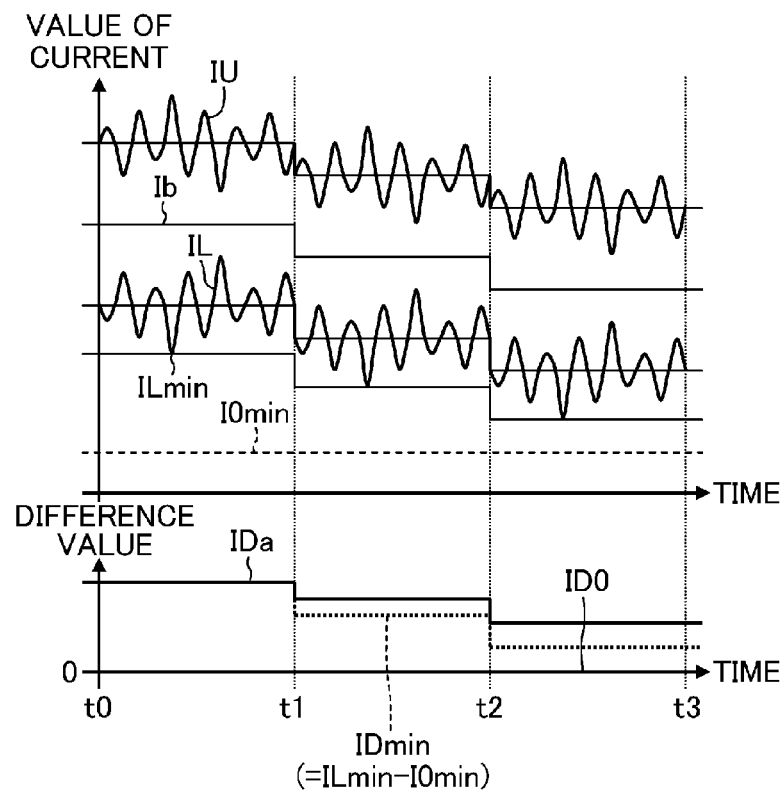
FIGS. 13A and 13B are timing charts for describing a fifth variation of the control index value.
Figure 13B:
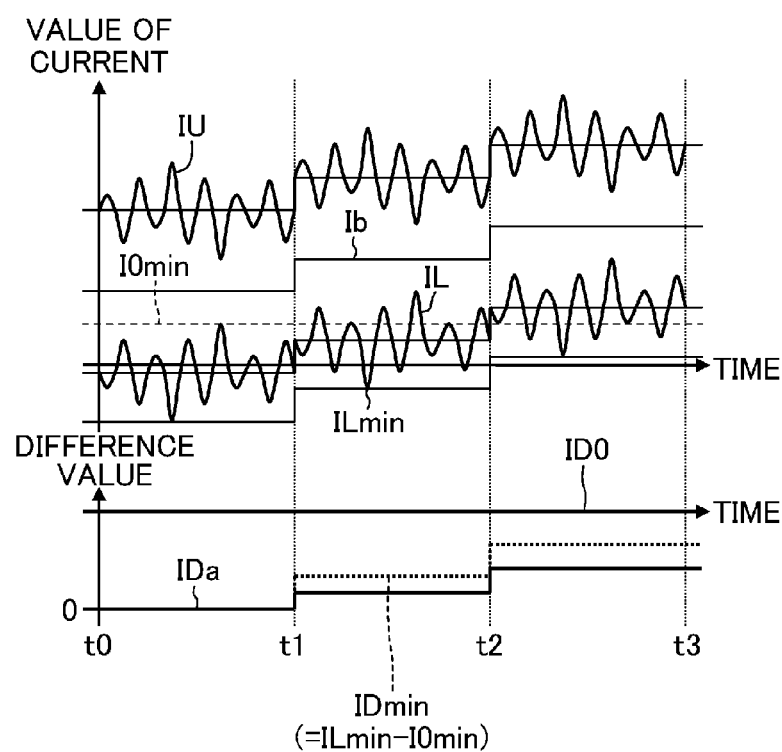

As shown in FIGS. 13A and 13B, the controller (11) may detect a difference value (IDmin) between the minimum value (ILmin) of the lower-coil current (IL) and the target minimum value (I0min) during each predetermined period of time, and detect a cumulative average value (IDa) of the difference value (IDmin) as the control index value. In this case, the target index value of the lower-coil current (IL) may be a target cumulative average value (ID0) (e.g., a value corresponding to the cumulative average value (IDa) which occurs when the degree of margin for error in control has the desired value). Note that, in FIGS. 13A and 13B, the target cumulative average value (ID0) is set to zero.

For example, the bias current calculator (113) may detect the cumulative average value (IDa) as follows. Specifically, at time (t1) (update timing), the bias current calculator (113) detects the minimum value (ILmin) of the lower-coil current (IL) during the period of time from time (t0) to time (t1), detects the difference value (IDmin) between the minimum value (ILmin) of the lower-coil current (IL) and the target minimum value (I0min), and sets the difference value (IDmin) as the cumulative average value (IDa). Next, at time (t2) (update timing), the bias current calculator (113) detects the minimum value (ILmin) of the lower-coil current (IL) during the period of time from time (t1) to time (t2), detects the difference value (IDmin) between the minimum value (ILmin) of the lower-coil current (IL) and the target minimum value (ILmin), and adds the difference value (IDmin) to the cumulative average value (IDa) to calculate the average, thereby updating the cumulative average value (IDa).

(Stability of Position Control)

Note that, in the magnetic bearing device (10), the middle value of the upper-coil and lower-coil currents (IU, IL) may excessively decrease due to any cause, so that the control of the position of the drive shaft (33) may become unstable. For example, when the middle value of the upper-coil and lower-coil currents (IU, IL) excessively decreases to zero, the control electromagnets (201, 203) attract the drive shaft (33) in opposite directions with the same magnitude of electromagnetic force, and therefore, the control of the position of the drive shaft (33) becomes unstable. When the middle value of the upper-coil and lower-coil currents (IU, IL) excessively decreases to fall below zero (the sign of the middle value of the upper-coil and lower-coil currents (IU, IL) is reversed), the combined electromagnetic force (F) of the control electromagnets (201, 203) is exerted in a direction opposite to the original direction (intended direction), and therefore, the control of the position of the drive shaft (33) becomes unstable.

(First Variation of Operation of Magnetic Bearing Device)

Therefore, the controller (11) may be configured to control the middle value of the upper-coil and lower-coil currents (IU, IL) so that the sum of an average value of the upper-coil current (IU) and an average value of the lower-coil current (IL) (hereinafter referred to as "the sum of average values of the upper-coil and lower-coil currents (IU, IL)") does not fall below a predetermined limit value. Note that the average value of the lower-coil current (IL) may be the average value (ILa) of the lower-coil current (IL) over each predetermined period of time, or the integral average value (ILi) of an of the lower-coil current (IL). Similarly, the average value of the upper-coil current (IU) may be an average value (IUa) of the upper-coil current (IU) over each predetermined period of time, or an integral average value (IUi) of the upper-coil current (IU). This holds true for the description that follows.

Figure 14:
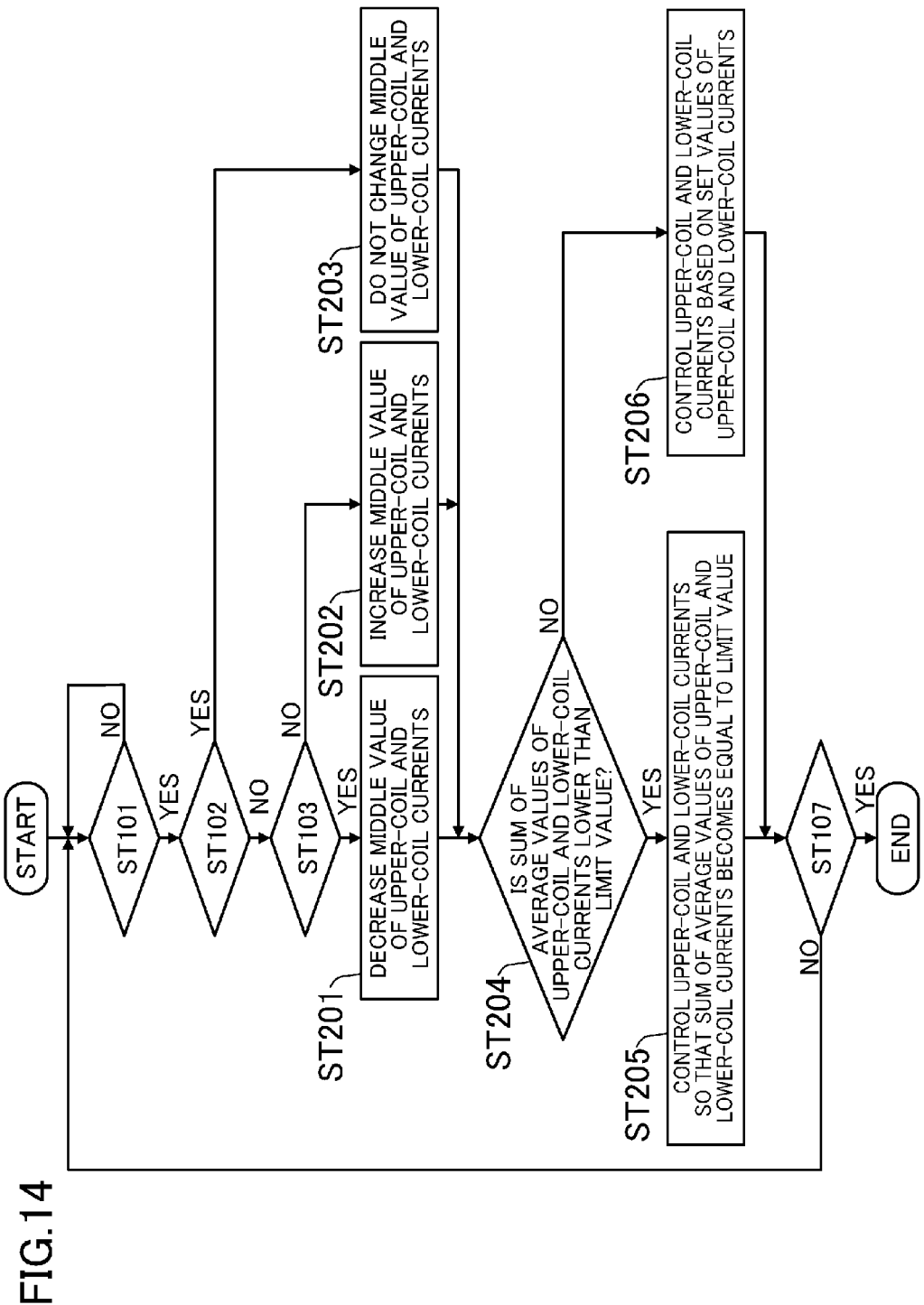
FIG. 14 is a flowchart for describing a first variation of the operation of the magnetic bearing device.

For example, as shown in FIG. 14, the controller (11) may be configured to perform the following steps (ST201, . . . , ST206) instead of the steps (ST104, . . . , ST106) of FIG. 6.

<Step (ST201)>

If it is determined in step (ST103) that the control index value (e.g., an average value of the lower-coil current (IL)) is greater than the target index value (e.g., the target current value), the bias current calculator (113) decreases the value of the bias current (Ib). The coil current calculator (114) determines the set values of the upper-coil and lower-coil currents (IU, IL) so that the middle value of the upper-coil and lower-coil currents (IU, IL) decreases in accordance with the decrease in the bias current (Ib). Next, control proceeds to step (ST204).

<Step (ST202)>

On the other hand, if it is determined in step (ST103) that the control index value is smaller than the target index value, the bias current calculator (113) increases the value of the bias current (Ib). The coil current calculator (114) determines the set values of the upper-coil and lower-coil currents (IU, IL) so that the middle value of the upper-coil and lower-coil currents (IU, IL) increases in accordance with the increase in the bias current (Ib). Next, control proceeds to step (ST204).

<Step (ST203)>

If it is determined in step (ST102) that the control index value falls within the allowable range, the bias current calculator (113) does not change, i.e., maintains the value of the bias current (Ib). The coil current calculator (114) determines the set values of the upper-coil and lower-coil currents (IU, IL) so that the middle value of the upper-coil and lower-coil currents (IU, IL) is not changed. Next, control proceeds to step (ST204).

<Step (ST204)>

Next, the coil current calculator (114) determines whether or not the sum of the average values of the upper-coil and lower-coil currents (IU, IL) is lower than a limit value. For example, the coil current calculator (114) may detect the sum of the average values of the upper-coil and lower-coil currents (IU, IL) based on the previous and current set values of the upper-coil and lower-coil currents (IU, IL). If the sum of the average values of the upper-coil and lower-coil currents (IU, IL) is lower than the limit value, control proceeds to step (ST205). Otherwise, control proceeds to step (ST206).

<Step (ST205)>

Next, the coil current calculator (114) changes the set values of the upper-coil and lower-coil currents (IU, IL) determined in one of steps (ST201, ST202, ST203) so that the middle value of the upper-coil and lower-coil currents (IU, IL) becomes equal to the limit value. Thereafter, the coil current calculator (114) performs a feedback control on the upper and lower voltage command values so that the detected values of the upper-coil and lower-coil currents (IU, IL) become equal to the set values of the upper-coil and lower-coil currents (IU, IL) (the changed set values). Thus, the values of the upper-coil current (IU) and the lower-coil current (IL) are controlled so that the middle value of the upper-coil and lower-coil currents (IU, IL) becomes equal to the limit value. Next, control proceeds to step (ST107).

<Step (ST206)>

On the other hand, if it is determined in step (ST204) that the sum of average values of the upper-coil and lower-coil currents (IU, IL) is higher than the limit value, the coil current calculator (114) performs a feedback control on the upper and lower voltage command values so that the detected values of the upper-coil and lower-coil currents (IU, IL) become equal to the set values of the upper-coil and lower-coil currents (IU, IL) determined by one of steps (ST201, ST202, ST203). Next, control proceeds to step (ST107).

<Advantages>

The above configuration can reduce or prevent an excessive decrease in the middle value of the upper-coil and lower-coil currents (IU, IL), and therefore, reduce or prevent an excessive deterioration in the control performance of the magnetic bearing device (10). As a result, the stability of the position control can be maintained.

(Second Variation of Operation of Magnetic Bearing Device)

Alternatively, the controller (11) may be configured to control the middle value of the upper-coil and lower-coil currents (IU, IL) so that the value of the bias current (Ib) does not fall below a predetermined limit value.

Figure 15:
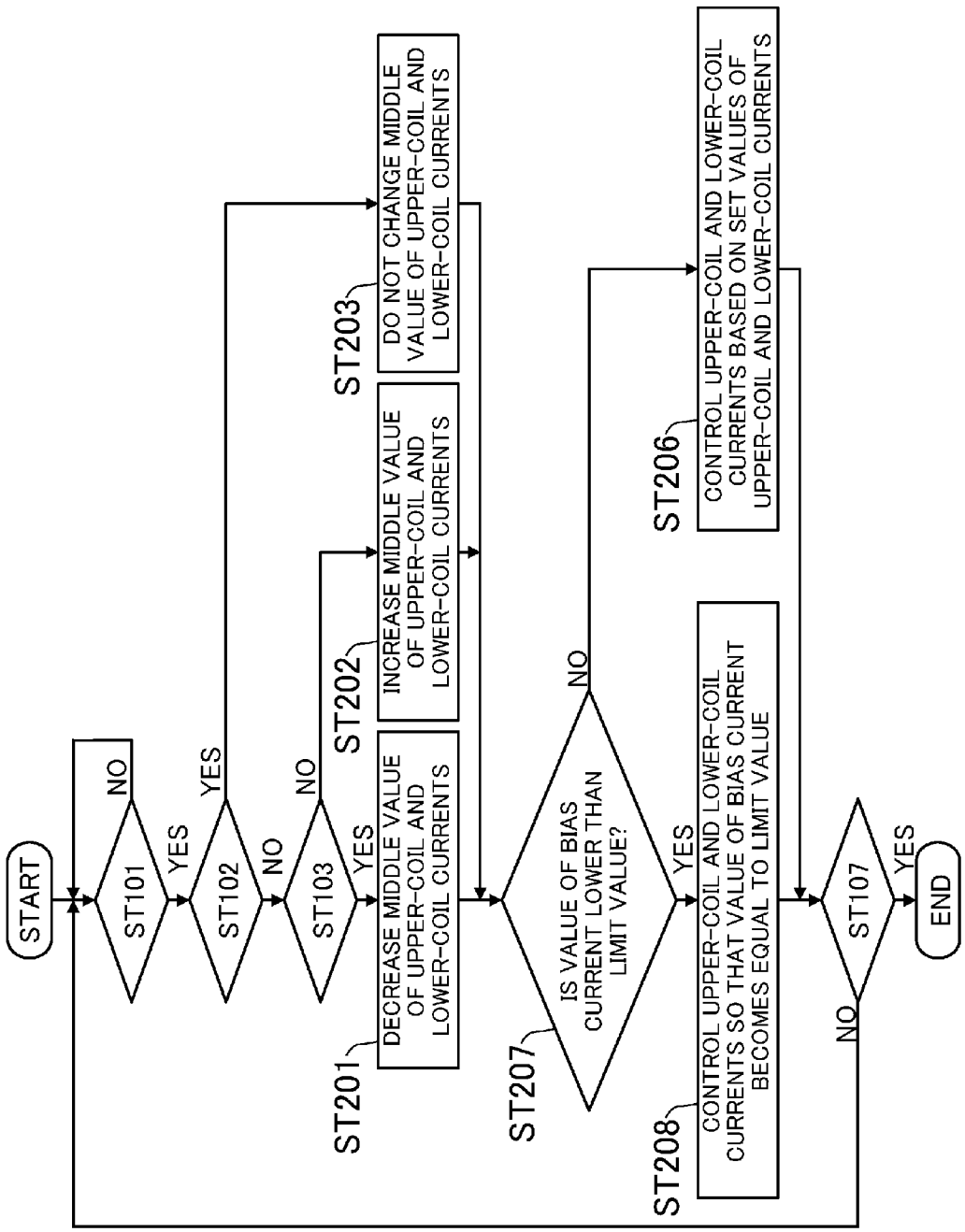
FIG. 15 is a flowchart for describing a second variation of the operation of the magnetic bearing device.

For example, as shown in FIG. 15, the controller (11) may be configured to perform the following steps (ST207, ST208) instead of steps (ST204, ST205) of FIG. 14.

<Step (ST207)>

The coil current calculator (114) determines whether or not the value of the bias current (Ib) (e.g., the value of the bias current (Ib) set by the bias current calculator (113)) is lower than a limit value. If the value of the bias current (Ib) is lower than the limit value, step (ST208). Otherwise, control proceeds to step (ST206).

<Step (ST208)>

Next, the coil current calculator (114) changes the set values of the upper-coil and lower-coil currents (IU, IL) determined by one of steps (ST201, ST202, ST203) so that the value of the bias current (Ib) becomes equal to the limit value. Thereafter, the coil current calculator (114) performs a feedback control on the upper and lower voltage command values so that the detected values of the upper-coil and lower-coil currents (IU, IL) become equal to the set values of the upper-coil and lower-coil currents (IU, IL) (the changed set values). Thus, the values of the upper-coil current (IU) and the lower-coil current (IL) are controlled so that the value of the bias current (Ib) becomes equal to the limit value. Next, control proceeds to step (ST107).

<Advantages>

The above configuration can also reduce or prevent an excessive decrease in the middle value of the upper-coil and lower-coil currents (IU, IL), and therefore, reduce or prevent an excessive deterioration in the control performance of the magnetic bearing device (10). As a result, the stability of the position control can be maintained.

Note that the bias current calculator (113) may be configured to determine whether or not the value of the bias current (Ib) is lower than the limit value. In this case, the following processes are performed in steps (ST206, ST207, ST208). Here, in steps (ST201, ST202, ST203), the coil current calculator (114) does not determine the set values of the upper-coil and lower-coil currents (IU, IL).

In step (ST207), the bias current calculator (113) determines whether or not the value of the bias current (Ib) determined by one of steps (ST201, ST202, ST203) is lower than the limit value. If the value of the bias current (Ib) is lower than the limit value, control proceeds to step (ST208). Otherwise, control proceeds to step (ST206).

In step (ST208), the bias current calculator (113) changes the value of the bias current (Ib) so that the value of the bias current (Ib) becomes equal to the limit value. The coil current calculator (114) determines the set values of the upper-coil and lower-coil currents (IU, IL) based on the control current (Id) and the changed bias current (Ib).

On the other hand, in step (ST206), the coil current calculator (114) determines the set values of the upper-coil and lower-coil currents (IU, IL) based on the control current (Id) and the bias current (Ib) determined by one of steps (ST201, ST202, ST203).

(Stability of Control of Upper-Coil and Lower-Coil Currents)

Note that when the values of the upper-coil current (IU) and the lower-coil current (IL) are not stable (e.g., the load (LD) exerted on the drive shaft (33) is not stable), then if the control of the middle value of the upper-coil and lower-coil currents (IU, IL) is performed, the middle value of the upper-coil and lower-coil currents (IU, IL) frequently changes, and therefore, the stability of the control of the middle value of the upper-coil and lower-coil currents (IU, IL) deteriorates. The frequent change in the middle value of the upper-coil and lower-coil currents (IU, IL) is likely to cause noise etc. Therefore, the control of the middle value of the upper-coil and lower-coil currents (IU, IL) is preferably performed when the values of the upper-coil current (IU) and the lower-coil current (IL) are stable.

(Third Variation of Operation of Magnetic Bearing Device)

Therefore, the controller (11) may be configured to control the middle value of the upper-coil and lower-coil currents (IU, IL) when the range of a change in at least one of the average value of the upper-coil current (IU) and the average value of the lower-coil current (IL) is smaller than a predetermined update threshold. The update threshold may be set based on conditions under which the drive shaft supported by the magnetic bearing body (21) without contact is operated (here, conditions under which the electric motor (30) is operated). For example, the update threshold corresponds to the range of a change in the average value of the upper-coil current (IU) (or the range of a change in the average value of the lower-coil current (IL)) which occurs when the values of the upper-coil current (IU) and the lower-coil current (IL) are substantially stable (e.g., the load (LD) exerted on the drive shaft (33) is substantially stable). The update threshold may be a fixed value or a variable value.

Figure 16:
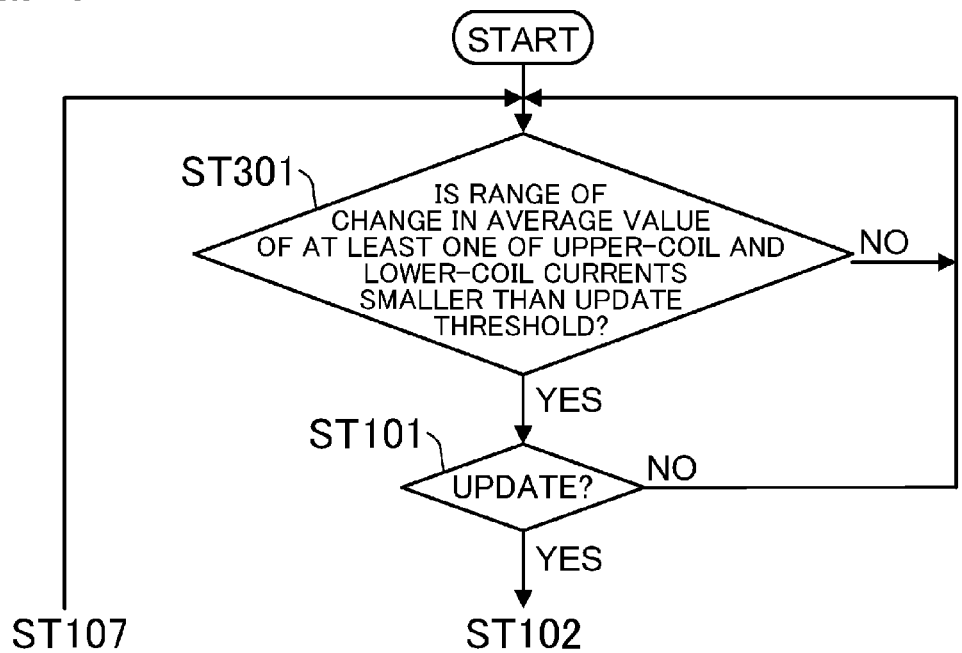
FIG. 16 is a flowchart for describing a third variation of the operation of the magnetic bearing device.

For example, as shown in FIG. 16, the controller (11) may be configured to perform the following step (ST301) in addition to steps (ST101, . . . , ST107) of FIG. 6.

<Step (ST301)>

Initially, the bias current calculator (113) determines whether or not the range of a change in at least one of the average value of the upper-coil current (IU) and the average value of the lower-coil current (IL) is smaller than the update threshold. For example, the bias current calculator (113) may detect the average value of the upper-coil current (IU) a plurality of times at intervals which are shorter than those at which the bias current (Ib) is updated, based on the values (detected values) of the upper-coil current (IU) detected by the current detector (102), thereby detecting the range of a change in the average value of the upper-coil current (IU). This holds true for the range of a change in the average value of the lower-coil current (IL). If the range of a change in at least one of the average value of the upper-coil current (IU) and the average value of the lower-coil current (IL) is smaller than the update threshold, control proceeds to step (ST101). Otherwise, step (ST301) is repeated.

<Advantages>

The above configuration can control the middle value of the upper-coil and lower-coil currents (IU, IL) when the values of the upper-coil current (IU) and the lower-coil current (IL) are stable (e.g., the load (LD) exerted on the drive shaft (33) is stable). As a result, the stability of the control of the middle value of the upper-coil and lower-coil currents (IU, IL) can be improved.

(Fourth Variation of Operation of Magnetic Bearing Device)

Alternatively, the controller (11) may be configured to control the middle value of the upper-coil and lower-coil currents (IU, IL) when the range of a change in the average value of the control current (Id) is smaller than a predetermined update threshold. The update threshold may be set based on conditions under which the drive shaft supported by the magnetic bearing body (21) without contact is operated (here, conditions under which the electric motor (30) is operated). For example, the update threshold corresponds to the range of a change in the average value of the control current (Id) which occurs when the values of the upper-coil current (IU) and the lower-coil current (IL) are substantially stable (e.g., the load (LD) exerted on the drive shaft (33) is substantially stable). The update threshold may be a fixed value or a variable value.

Figure 17:
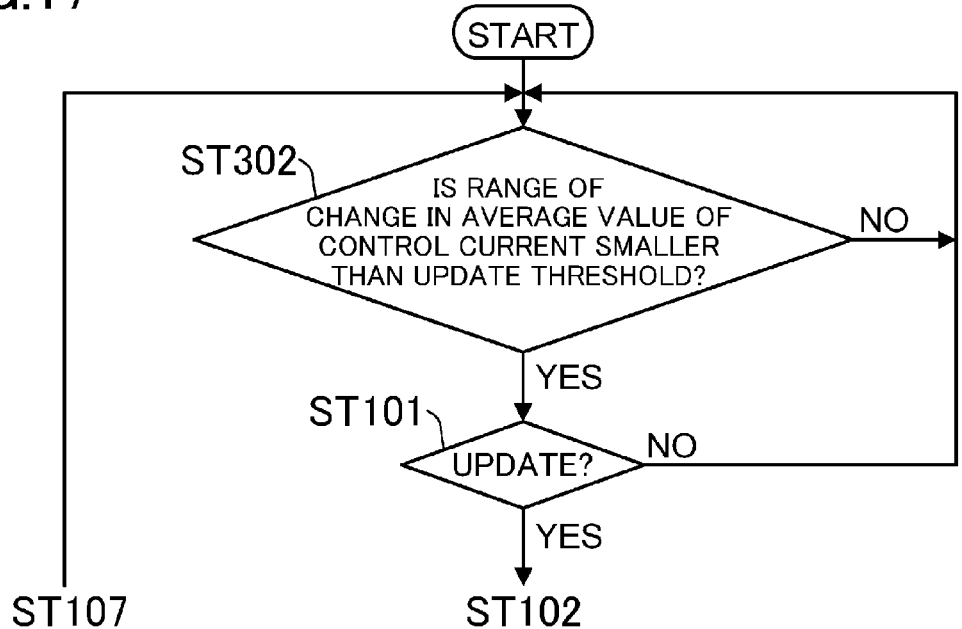
FIG. 17 is a flowchart for describing a fourth variation of the operation of the magnetic bearing device.

For example, as shown in FIG. 17, the controller (11) may be configured to perform the following step (ST302) in addition to steps (ST101, . . . , ST107) of FIG. 6.

<Step (ST302)>

Initially, the bias current calculator (113) determines whether or not the range of a change in the average value of the control current (Id) is smaller than the update threshold. For example, the bias current calculator (113) may detect the average value of the control current (Id) a plurality of times at intervals which are shorter than those at which the bias current (Ib) is updated, based on the values (detected values) of the control current (Id) detected by the control current calculator (112), thereby detecting the range of a change in the average value of the control current (Id). If the range of a change in the average value of the control current (Id) is smaller than the update threshold, control proceeds to step (ST101). Otherwise, step (ST302) is repeated.

<Advantages>

The above configuration can also control the middle value of the upper-coil and lower-coil currents (IU, IL) when the values of the upper-coil current (IU) and the lower-coil current (IL) are stable (e.g., the load (LD) exerted on the drive shaft (33) is stable). As a result, the stability of the control of the middle value of the upper-coil and lower-coil currents (IU, IL) can be improved.

(Fifth Variation of Operation of Magnetic Bearing Device)

Alternatively, the controller (11) may be configured to control the middle value of the upper-coil and lower-coil currents (IU, IL) when the range of a change in frequency components higher than or equal to a predetermined frequency of at least one of the average value of the upper-coil current (IU) and the average value of the lower-coil current (IL) (i.e., the range of a change in frequency components higher than or equal to the predetermined frequency of the frequency components of the average value) is smaller than a predetermined update threshold. The update threshold may be set based on conditions under which the drive shaft supported by the magnetic bearing body (21) without contact is operated (here, conditions under which the electric motor (30) is operated). For example, the update threshold corresponds to the range of a change in frequency components higher than or equal to the predetermined frequency of the average value of the upper-coil current (IU) (or the range of a change in frequency components higher than or equal to the predetermined frequency of the average value of the lower-coil current (IL)) which occurs when the values of the upper-coil current (IU) and the lower-coil current (IL) are substantially stable (e.g., the load (LD) exerted on the drive shaft (33) is substantially stable). The update threshold may be a fixed value or a variable value.

Figure 18:
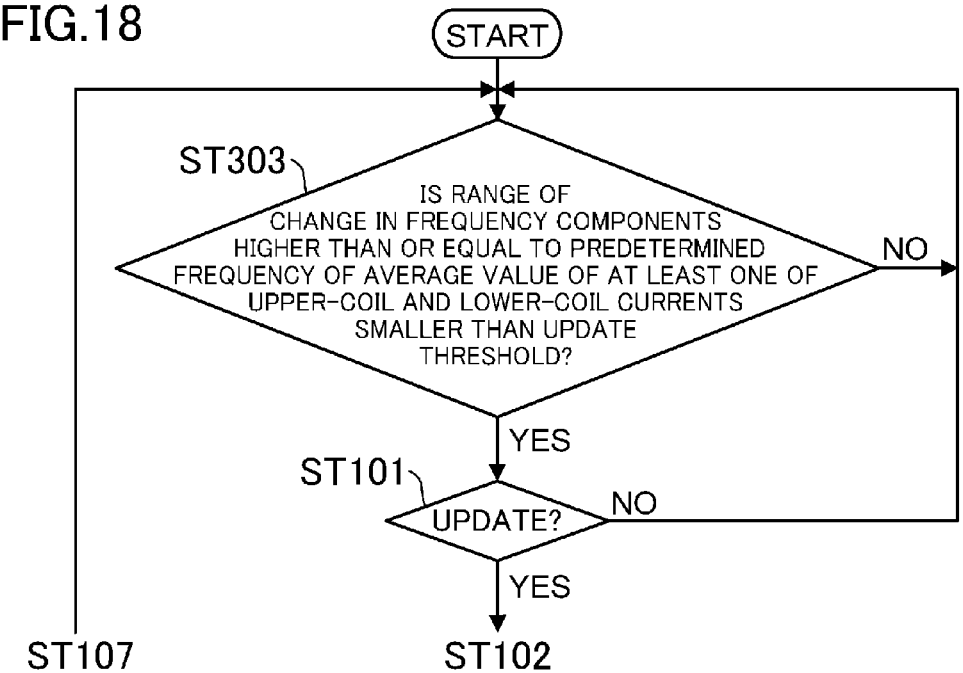
FIG. 18 is a flowchart for describing a fifth variation of the operation of the magnetic bearing device.

For example, as shown in FIG. 18, the controller (11) may be configured to perform the following step (ST303) in addition to steps (ST101, . . . , ST107) of FIG. 6.

<Step (ST303)>

Initially, the bias current calculator (113) determines whether or not the range of a change in frequency components higher than or equal to the predetermined frequency of at least one of the average value of the upper-coil current (IU) and the average value of the lower-coil current (IL) is smaller than the update threshold. For example, the bias current calculator (113) may detect the average value of the upper-coil current (IU) a plurality of times at intervals which are shorter than those at which the bias current (Ib) is updated, based on the values (detected values) of the upper-coil current (IU) detected by the current detector (102), thereby detecting the range of a change in frequency components higher than or equal to the predetermined frequency of the average value of the upper-coil current (IU). This holds true for the range of a change in frequency components higher than or equal to the predetermined frequency of the average value of the lower-coil current (IL). If the range of a change in frequency components higher than or equal to the predetermined frequency of at least one of the average value of the upper-coil current (IU) and the average value of the lower-coil current (IL) is smaller than the update threshold, control proceeds to step (ST101). Otherwise, step (ST301) is repeated.

<Advantages>

The above configuration can control the middle value of the upper-coil and lower-coil currents (IU, IL) when the values of the upper-coil current (IU) and the lower-coil current (IL) are stable (e.g., the load (LD) exerted on the drive shaft (33) is stable). As a result, the stability of the control of the middle value of the upper-coil and lower-coil currents (IU, IL) can be improved.

(Sixth Variation of Operation of Magnetic Bearing Device)

Alternatively, the controller (11) may be configured to control the middle value of the upper-coil and lower-coil currents (IU, IL) when the range of a change in frequency components higher than or equal to a predetermined frequency of the average value of the control current (Id) (i.e., the range of a change in frequency components higher than or equal to the predetermined frequency of the frequency components of the average value) is smaller than a predetermined update threshold. The update threshold may be set based on conditions under which the drive shaft supported by the magnetic bearing body (21) without contact is operated (here, conditions under which the electric motor (30) is operated). For example, the update threshold corresponds to the range of a change in frequency components higher than or equal to the predetermined frequency of the average value of the control current (Id) which occurs when the values of the upper-coil current (IU) and the lower-coil current (IL) are substantially stable (e.g., the load (LD) exerted on the drive shaft (33) is substantially stable). The update threshold may be a fixed value or a variable value.

Figure 19:
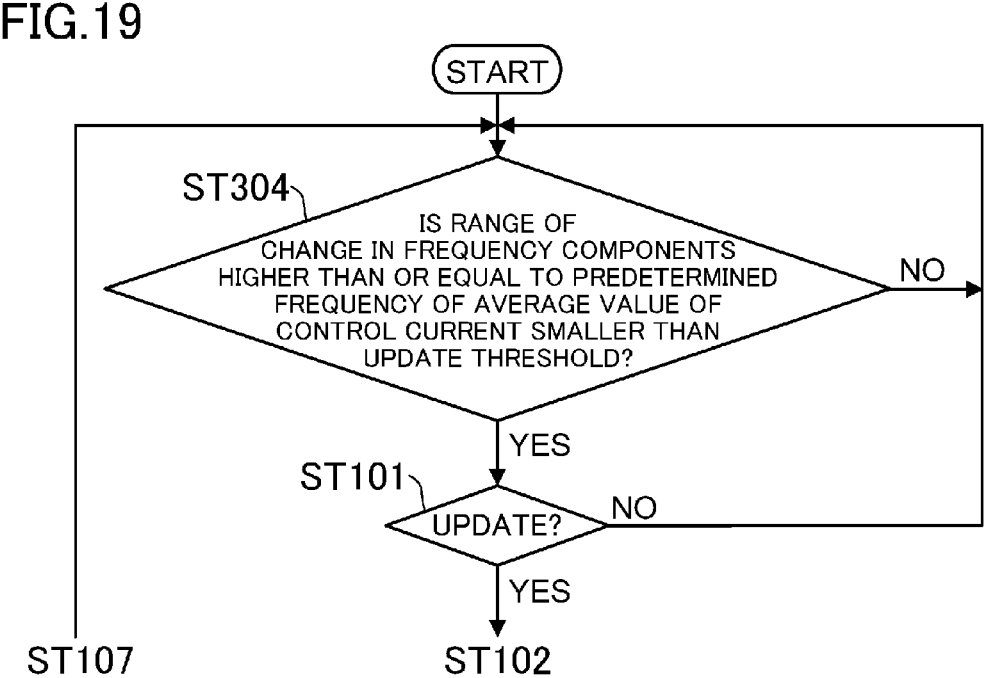
FIG. 19 is a flowchart for describing a sixth variation of the operation of the magnetic bearing device.

For example, as shown in FIG. 19, the controller (11) may be configured to perform the following step (ST304) in addition to steps (ST101, . . . , ST107) of FIG. 6.

<Step (ST304)>

Initially, the bias current calculator (113) determines whether or not the range of a change in frequency components higher than or equal to the predetermined frequency of control current (Id) is lower than the update threshold. For example, the bias current calculator (113) may detect the average value of the control current (Id) a plurality of times at intervals which are shorter than those at which the bias current (Ib) is updated, based on the values (detected values) of the control current (Id) detected by the current detector (102), thereby detecting the range of a change in frequency components higher than or equal to the predetermined frequency of the average value of the control current (Id). If the range of a change in frequency components higher than or equal to the predetermined frequency of the control current (Id) is smaller than the update threshold, control proceeds to step (ST101). Otherwise, step (ST304) is repeated.

<Advantages>

The above configuration can control the middle value of the upper-coil and lower-coil currents (IU, IL) when the values of the upper-coil current (IU) and the lower-coil current (IL) are stable (e.g., the load (LD) exerted on the drive shaft (33) is stable). As a result, the stability of the control of the middle value of the upper-coil and lower-coil currents (IU, IL) can be improved.

(Summary of Variations of Magnetic Bearing Device)

Note that, in the magnetic bearing device (10), the controller (11) may be configured to perform one of the process (steps (ST101, . . . , ST103, ST201, . . . , ST206, ST107)) of FIG. 14 and the process (steps (ST101, . . . , ST103, ST201, . . . , ST203, ST206, . . . , ST208, ST107)) of FIG. 15, and one of the process (step (ST301)) of FIG. 16, the process (step (ST302)) of FIG. 17, the process (step (ST303)) of FIG. 18, and the process (step (ST304)) of FIG. 19.

(Variation of Power Supply Circuit)

Figure 20:
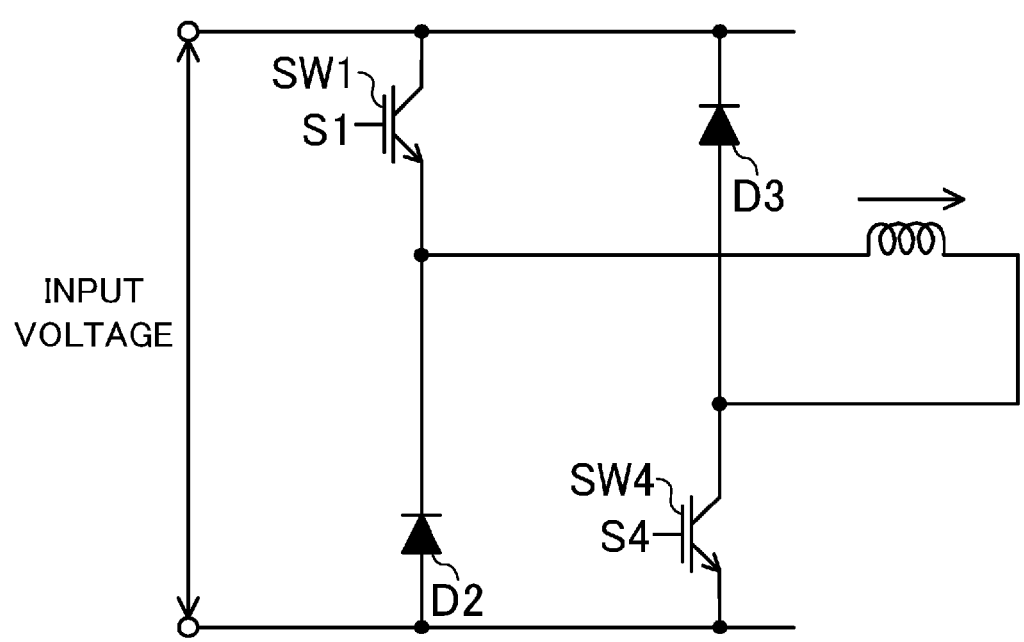
FIG. 20 is a circuit diagram for describing a variation of the power supply circuit.

The power supply circuit (104) may include an inverter circuit, such as that shown in FIG. 20, for each of the upper and lower coils. The inverter circuit of FIG. 20 includes two switching elements (SW1, SW4) and two rectification elements (D2, D3). Note that the inverter circuit cannot be used to change the direction of the current passed through the coil (23).

Figure 21A:
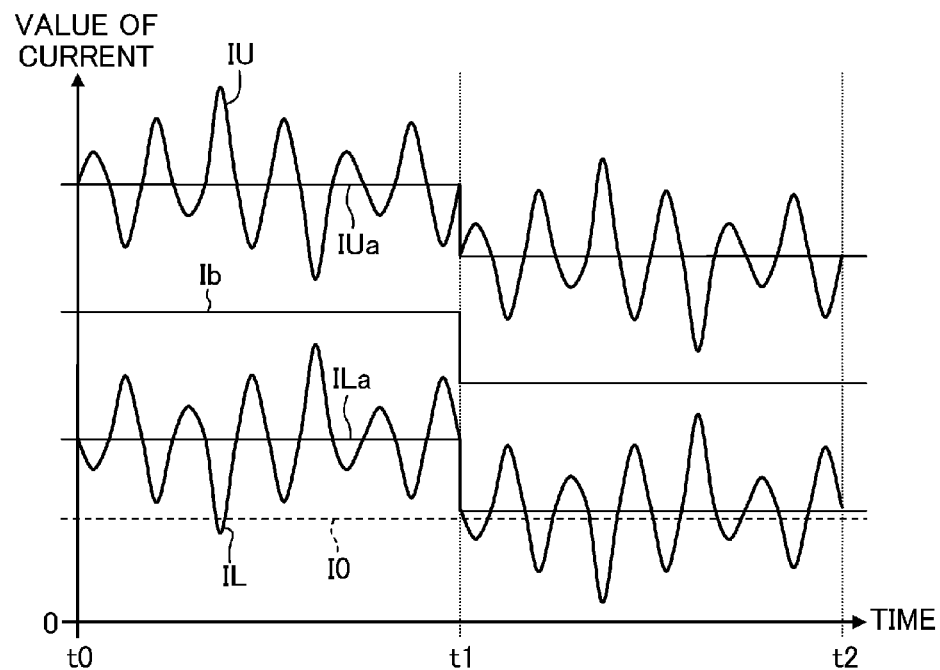
FIGS. 21A and 21B are timing charts for describing operation of a magnetic bearing device including the power supply circuit of FIG. 20.
Figure 21B:
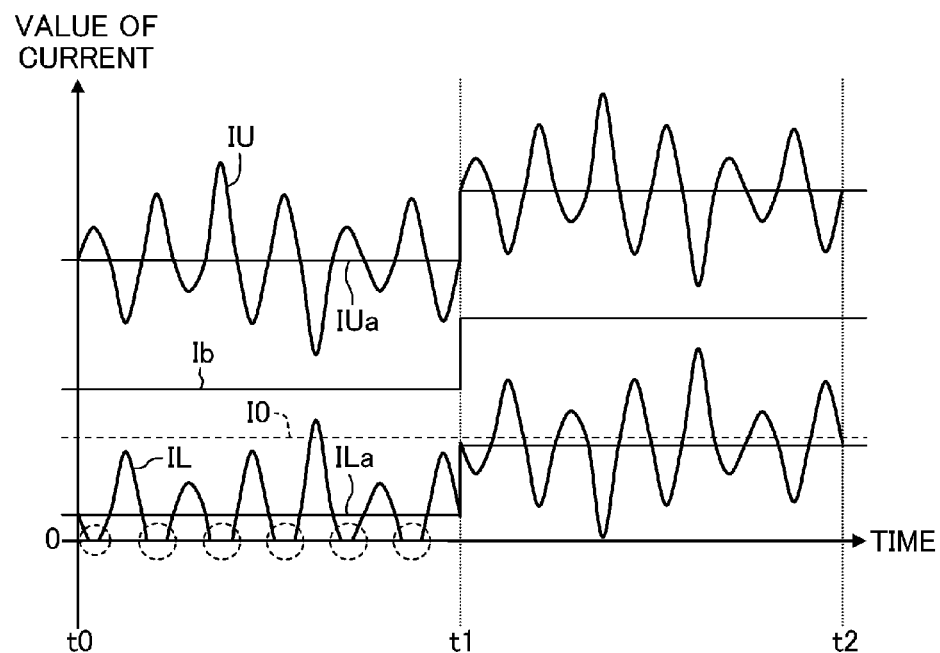

Here, operation of the magnetic bearing device (10) (the control of the middle value of the upper-coil and lower-coil currents (IU, IL) by the controller (11)) where the inverter circuit of the power supply circuit (104) is configured as shown in FIG. 20 will be described with reference to FIGS. 21A and 21B. The waveform of the lower-coil current (IL) is similar to that shown in FIG. 7A when there is not a period of time during which the value of the lower-coil current (IL) is zero as shown in FIG. 21A, and is different from that shown in FIG. 7B when there is a period of time during which the value of the lower-coil current (IL) is zero as shown in FIG. 21B. Specifically, when the inverter circuit of the power supply circuit (104) is configured as shown in FIG. 20, a zero-crossing does not occur in the lower-coil current (IL). Instead, there is a zero-current period of the lower-coil current (IL) (a period of time during which the value of the lower-coil current (IL) continues to be zero, i.e., a portion enclosed by a dotted line in FIG. 21B). If there is a zero-current period of the lower-coil current (IL), the control current (Id) and the combined electromagnetic force (F) has a non-linear relationship. As a result, the control performance of the magnetic bearing device (10) deteriorates. However, in the magnetic bearing device (10) of this embodiment, the middle value of the upper-coil and lower-coil currents (IU, IL) is controlled so that the control index value which is an index of the degree of margin for error in controlling the magnetic bearing device (10) approaches the target index value, whereby the degree of margin for error in controlling the magnetic bearing device (10) can be suitably set, and therefore, the occurrence of the zero-current period of the lower-coil current (IL) can be reduced or prevented. Therefore, even when the inverter circuit of the power supply circuit (104) is configured as shown in FIG. 20, the linear relationship between the control current (Id) and the combined electromagnetic force (F) can be maintained, and therefore, the deterioration in the control performance of the magnetic bearing device (10) can be reduced or prevented.

(First Variation of Magnetic Bearing Body)

Figure 23:
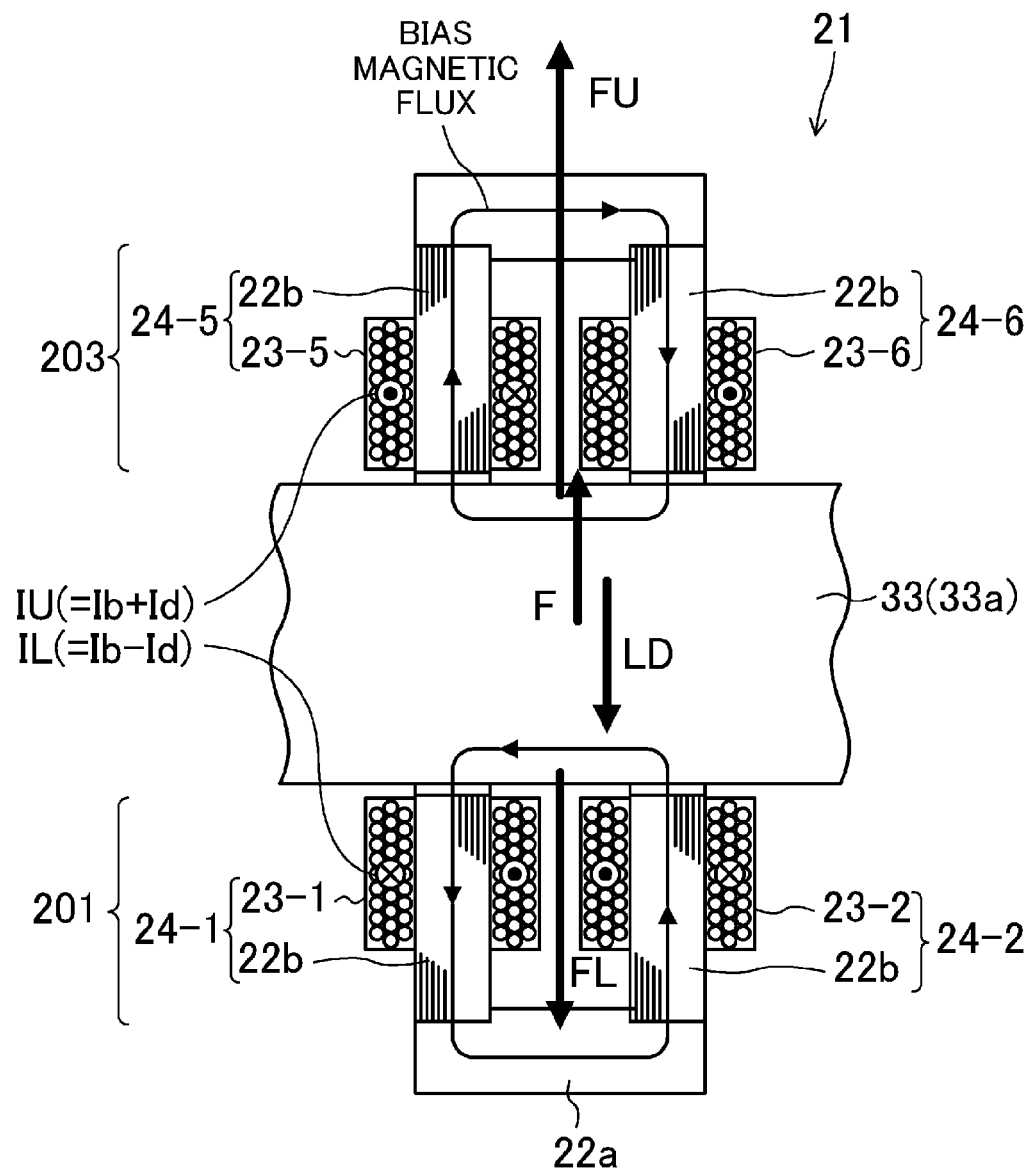
FIG. 23 is a longitudinal cross-sectional view for describing the first variation of the magnetic bearing body.

As shown in FIGS. 22 and 23, the magnetic bearing body (21) may be a homopolar radial bearing. FIG. 22 is a transverse cross-sectional view (a cross-sectional view perpendicular to the drive shaft) of the magnetic bearing body (21). FIG. 23 is a longitudinal cross-sectional view (a cross-sectional view in the drive axial direction) of the magnetic bearing body (21). Similar to the magnetic bearing body (21) of FIGS. 2 and 3, this magnetic bearing body (21) includes a core portion (22) and a plurality of (here, eight) coils (23-1, . . . , 23-8). Note that, in this magnetic bearing body (21), four tooth portions (22b, . . . , 22b) are arranged along the inner circumference of the back yoke portion (22a) and equally spaced at a pitch of 90° as viewed from the axial direction, and two tooth portions (22b, 22b) are arranged side by side in the axial direction. In other words, the tooth portions (22b, . . . , 22b) form a double-stage structure.

Coils (23-1, 23-3, 23-5, 23-7) are wound around the four tooth portions (22b, 22b, 22b, 22b), respectively, in the first stage. Coils (23-2, 23-4, 23-6, 23-8) are wound around the four tooth portions (22b, 22b, 22b, 22b), respectively, in the second stage. Thus, eight electromagnets (24-1, . . . , 24-8) are formed. The coils (23-1, 23-3, 23-5, 23-7) in the first stage and the coils (23-2, 23-4, 23-6, 23-8) in the second stage are paired, respectively. The first-stage coil (23-1) and the second-stage coil (23-2) are arranged side by side in the axial direction, and the first-stage coil (23-1) is connected to the second-stage coil (23-2). This holds true for the first-stage coils (23-3, 23-5, 23-7) and the second-stage coils (23-4, 23-6, 23-8). Thus, four control electromagnets (201, . . . , 204) are formed. Note that the directions in which the coils (23-1, . . . , 23-8) are wound and the directions of currents passed through the coils (23-1, . . . , 23-8) are set so that magnetic flux is generated in directions indicated by arrows in FIG. 22 and FIG. 23.

In the above configuration, the control electromagnets (201, 202) face the control electromagnets (203, 204), respectively, with the supported portion (33a) of the drive shaft (33) being interposed therebetween. Therefore, by the combined electromagnetic force (F) of the control electromagnets (201, . . . , 204), the position in the radial direction of the drive shaft (33) can be controlled and the drive shaft (33) can be supported without contact.

(Second Variation of Magnetic Bearing Body)

Figure 24:
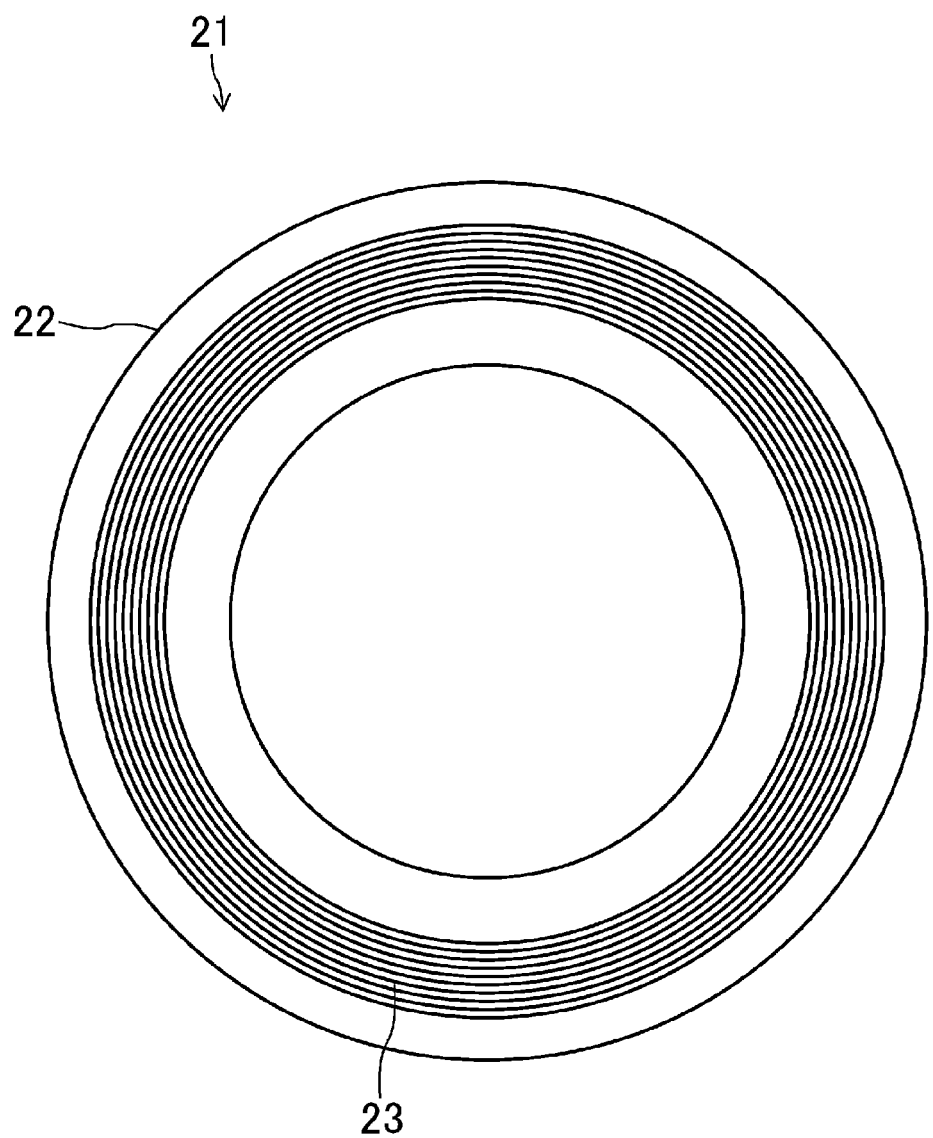
FIG. 24 is a transverse cross-sectional view for describing a second variation of the magnetic bearing body.
Figure 25:
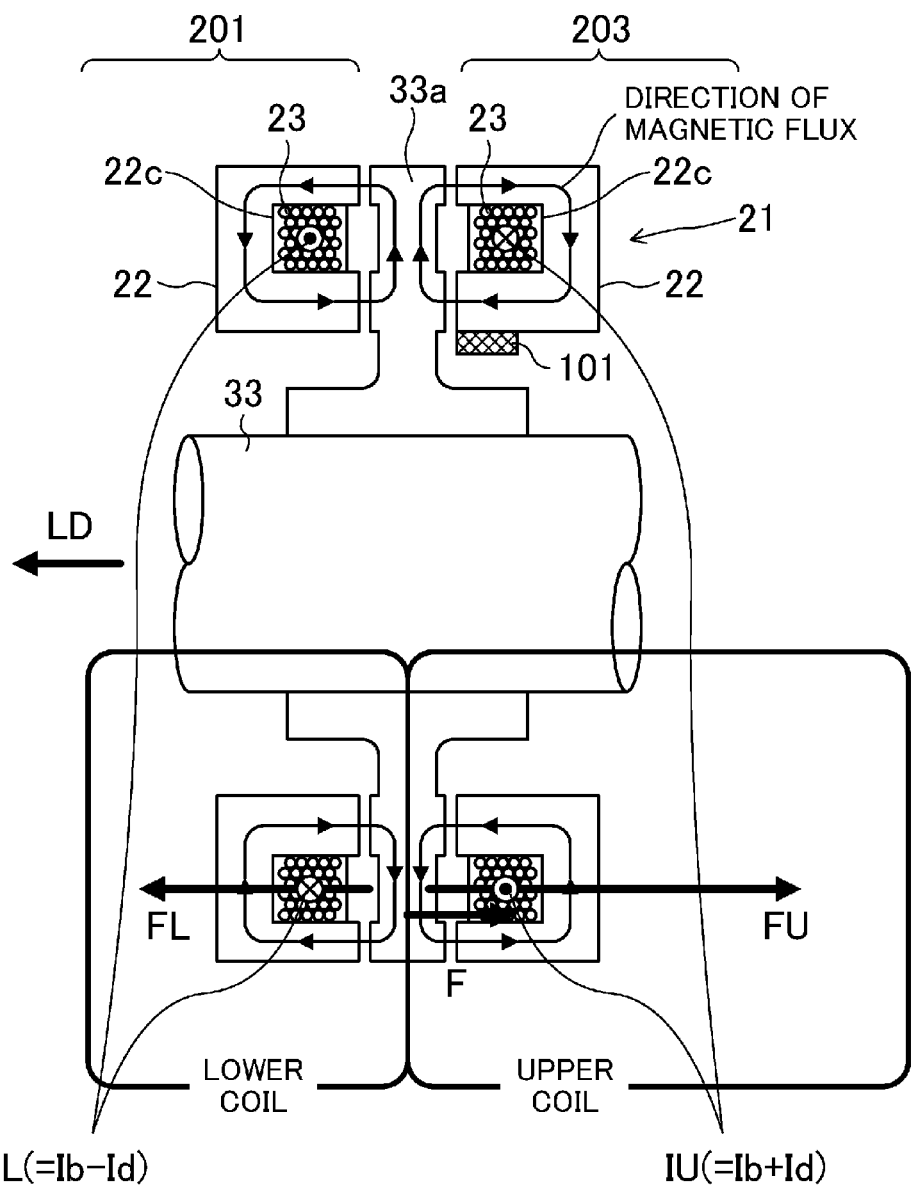
FIG. 25 is a longitudinal cross-sectional view for describing the second variation of the magnetic bearing body.

Alternatively, as shown in FIGS. 24 and 25, the magnetic bearing body (21) may be a thrust bearing. FIG. 24 is a transverse cross-sectional view (a cross-sectional view perpendicular to the drive shaft) of the magnetic bearing body (21). FIG. 25 is a longitudinal cross-sectional view (a cross-sectional view in the drive axial direction) of the magnetic bearing body (21). The magnetic bearing body (21) includes two core portions (22, 22) and two coils (23, 23). A thrust disk (supported portion (33a)) is fixed to the drive shaft (33). The core portions (22, 22), which are in the shape of a ring, are located on the opposite sides in the axial direction of the thrust disk with a predetermined air gap being interposed therebetween. There, the gap sensor (101) is configured to detect a position in the axial direction of the thrust disk.

The core portions (22, 22) have circumferential grooves (22c, 22c) formed in surfaces thereof (surfaces facing the thrust disk). The coils (23, 23) are accommodated in the respective circumferential grooves (22c, 22c). As a result, a pair of control electromagnets (201, 203) are formed, facing each other with the supported portion (33a) of the drive shaft (33) being interposed therebetween. Here, each of the control electromagnets (201, 203) includes a single electromagnet (an electromagnet including the core portion (22) and the coil (23)). Note that the directions in which the coils (23, 23) are wound and the directions of currents passed through the coils (23, 23) are set so that magnetic flux is generated in directions indicated by arrows in FIG. 25.

In the above configuration, by the combined electromagnetic force (F) of the control electromagnets (201, 203), the position in the radial direction of the drive shaft (33) can be controlled and the drive shaft (33) can be supported without contact.

Other Embodiments

In the foregoing description, as an example, the controller (11) (specifically, the bias current calculator (113)) detects the control index value based on the value of the lower-coil current (IL) detected by the current detector (102). Alternatively, the controller (11) may be configured to back-calculate the value of the lower-coil current (IL) from the lower voltage command value. In this case, the controller (11) detects the control index value based on the value of the lower-coil current (IL) back-calculated from the lower voltage command value. Similarly, the controller (11) may be configured to back-calculate the value of the upper-coil current (IL) from the upper voltage command value.

Note that the intervals at which the control index value is detected may be the same as or shorter than those at which the bias current (Ib) is updated.

The controller (11) may be configured to update a control parameter (e.g., a feedback gain) of the controller (11) as well as the bias current (Ib) so that the combined electromagnetic force (F) (see the expression (3)) determined based on the bias current (Ib) and the control current (Id) is not changed before and after the updating of the bias current (Ib).

The calculation circuit (103) may be implemented by a microcomputer (hardware) and a program (software) executed by the microcomputer, or by a dedicated circuit.

Note that the above embodiments are merely preferred examples in nature and are not intended to limit the present invention, application, or uses.

INDUSTRIAL APPLICABILITY

As described above, the above magnetic bearing device is useful for an electric motor included in a compressor, for example.

DESCRIPTION OF REFERENCE CHARACTERS

1 COMPRESSOR
10 MAGNETIC BEARING DEVICE
30 ELECTRIC MOTOR
40 DRIVE SHAFT
50 CASING
50 IMPELLER
60 TOUCHDOWN BEARING
11 CONTROLLER
21 MAGNETIC BEARING BODY
22 CORE PORTION
23 COIL
24 ELECTROMAGNET
101 GAP SENSOR
102 COIL CURRENT DETECTOR
103 CALCULATION CIRCUIT
104 POWER SUPPLY CIRCUIT
201-204 CONTROL ELECTROMAGNET

The invention claimed is:
1. A magnetic bearing device comprising:
a magnetic bearing body including at least one pair of control electromagnets facing each other with a supported portion of a rotating shaft being interposed therebetween, and configured to support the rotating shaft using a combined electromagnetic force of the at least one pair of control electromagnets without contact; and
a controller configured to
detect a control index value based on a first coil current passed through a coil of a first control electromagnet of the pair of control electromagnets which generates an electromagnetic force in the same direction as that of a load exerted on the rotating shaft, the control index value being an index of the degree of margin for error in control depending on a value of the first coil current, and control a middle value of a pair of coil currents passed through the respective corresponding coils of the pair of control electromagnets so that the control index value approaches a predetermined target index value.

2. The magnetic bearing device of claim 1, wherein the controller controls the middle value of the pair of coil currents so that an average value of the first coil current approaches a predetermined target current value.

3. The magnetic bearing device of claim 1, wherein the controller controls the middle value of the pair of coil currents so that a minimum value of the first coil current during a predetermined period of time approaches a predetermined target minimum value.

4. The magnetic bearing device of claim 1, wherein the controller controls the middle value of the pair of coil currents so that an average value of local minimum values of the first coil current during a predetermined period of time approaches a predetermined target average value.

5. The magnetic bearing device of claim 1, wherein the controller controls the middle value of the pair of coil currents so that a time proportion of a high-level period during which a value of the first coil current is higher than a predetermined target current value within a predetermined period of time approaches a predetermined target time proportion.

6. The magnetic bearing device of claim 1, wherein the controller detects a difference value between a minimum value of the first coil current and a predetermined target minimum value during each predetermined period of time, and controls the middle value of the pair of coil currents so that a cumulative average value of the difference value approaches a predetermined target cumulative average value.

7. The magnetic bearing device of claim 1, wherein the controller does not change the middle value of the pair of coil currents, when the control index value falls within an allowable range including the target index value.

8. The magnetic bearing device of claim 1, wherein the controller increases the amount of a change in the middle value of the pair of coil currents as a difference value between the control index value and the target index value increases.

9. The magnetic bearing device of claim 1, wherein the controller controls the middle value of the pair of coil currents so that a sum of average values of the pair of coil currents does not fall below a predetermined limit value.

10. The magnetic bearing device of claim 1, wherein each of the pair of coil currents includes a bias current corresponding to the middle value of the pair of coil currents, and a control current corresponding to a difference value between the middle value of the pair of coil currents and the each of the pair of coil currents, and the controller controls the middle value of the pair of coil currents so that a value of the bias current does not fall below a predetermined limit value.

11. The magnetic bearing device of claim 1, wherein the controller controls the middle value of the pair of coil currents when a range of a change in at least one of an average value of the first coil current and an average value of a second coil current is smaller than a predetermined update threshold, the second coil current being passed through a coil of a second control electromagnet of the pair of control electromagnets which generates an electromagnetic force in a direction opposite to that of the load of the rotating shaft.

12. The magnetic bearing device of claim 1, wherein each of the pair of coil currents includes a bias current corresponding to the middle value of the pair of coil currents, and a control current corresponding to a difference value between the middle value of the pair of coil currents and the each of the pair of coil currents, and the controller controls the middle value of the pair of coil currents when a range of a change in an average value of the control current is smaller than a predetermined update threshold.

13. The magnetic bearing device of claim 1, wherein the controller controls the middle value of the pair of coil currents when a range of a change in frequency components higher than or equal to a predetermined frequency of at least one of an average value of the first coil current and an average value of a second coil current is smaller than a predetermined update threshold, the second coil current being passed through a coil of a second control electromagnet of the pair of control electromagnets which generates an electromagnetic force in a direction opposite to that of the load of the rotating shaft.

14. The magnetic bearing device of claim 1, wherein each of the pair of coil currents includes a bias current corresponding to the middle value of the pair of coil currents, and a control current corresponding to a difference value between the middle value of the pair of coil currents and the each of the pair of coil currents, and the controller controls the middle value of the pair of coil currents when a range of a change in frequency components higher than or equal to a predetermined frequency of an average value of the control current is smaller than a predetermined update threshold.

15. A compressor comprising:
the magnetic bearing device of claim 1;
an electric motor including a drive shaft supported by the magnetic bearing device without contact; and
a compressor mechanism driven by the electric motor.

* * * * *